US011669770B2

(12) United States Patent
Zancanato et al.

(10) Patent No.: US 11,669,770 B2
(45) Date of Patent: Jun. 6, 2023

(54) ACTIVITY RECOGNITION METHOD WITH AUTOMATIC TRAINING BASED ON INERTIAL SENSORS

(71) Applicant: STMicroelectronics S.r.l., Agrate Brianza (IT)

(72) Inventors: Alberto Zancanato, Milan (IT); Stefano Paolo Rivolta, Desio (IT)

(73) Assignee: STMICROELECTRONICS S.r.l., Agrate Brianza (IT)

( * ) Notice: Subject to any disclaimer, the term of this patent is extended or adjusted under 35 U.S.C. 154(b) by 1226 days.

(21) Appl. No.: 16/203,275

(22) Filed: Nov. 28, 2018

(65) Prior Publication Data

US 2020/0167559 A1 May 28, 2020

(51) Int. Cl.
*G06N 20/00* (2019.01)
*G01C 19/00* (2013.01)
*G01P 15/00* (2006.01)
*G06F 3/0346* (2013.01)

(52) U.S. Cl.
CPC ............. *G06N 20/00* (2019.01); *G01C 19/00* (2013.01); *G01P 15/00* (2013.01); *G06F 3/0346* (2013.01); *G06F 2218/02* (2023.01); *G06F 2218/08* (2023.01); *G06F 2218/12* (2023.01)

(58) Field of Classification Search
CPC . G06K 9/00536; G06K 9/00523; G06N 20/00
See application file for complete search history.

(56) References Cited

U.S. PATENT DOCUMENTS

| 9,961,547 | B1 * | 5/2018 | Molina-Markham ... H04M 1/67 |
| 10,629,048 | B2 * | 4/2020 | Tan .......................... G01S 19/13 |
| 2002/0161853 | A1 * | 10/2002 | Burak .................... G06Q 40/00 |
|  |  |  | 709/218 |
| 2006/0047655 | A1 | 3/2006 | Peter |
| 2012/0310587 | A1 | 12/2012 | Tu et al. |

(Continued)

FOREIGN PATENT DOCUMENTS

| EP | 3 258 333 A1 | 12/2017 |
| WO | 2012/134797 A1 | 10/2012 |
| WO | WO-2016122346 A1 * | 8/2016 |

OTHER PUBLICATIONS

Trabelsi et al., "An Unsupervised Approach for Automatic Activity Recognition based on Hidden Markov Model Regression," *IEEE Transactions on Automation Science and Engineering* 10(3):829-835, 2013.

*Primary Examiner* — Namrata Boveja
*Assistant Examiner* — William D Newlon
(74) *Attorney, Agent, or Firm* — Seed Intellectual Property Law Group LLP

(57) ABSTRACT

Technological advancements are disclosed that utilize inertial sensor data associated with a device to determine a new feature array and if the new feature array is within an existing class within a state space associated with the inertial sensor data. In response to the new feature array being included in the existing class, the new feature array is added to the existing class and a representation of the existing class in the state space is updated based on the new feature array and an existing representation of the existing class. In response to the new feature array not being included in the existing class, a new class is created based on the new feature array.

25 Claims, 15 Drawing Sheets

(56) References Cited

U.S. PATENT DOCUMENTS

| | | | |
|---|---|---|---|
| 2014/0007010 A1* | 1/2014 | Blom | G06F 3/011 |
| | | | 715/825 |
| 2014/0114767 A1* | 4/2014 | Zhang | G06Q 30/0267 |
| | | | 705/14.64 |
| 2016/0139686 A1* | 5/2016 | Tu | G06F 3/0346 |
| | | | 345/659 |
| 2018/0189376 A1* | 7/2018 | Iyer | G06N 20/00 |
| 2018/0314920 A1* | 11/2018 | Cai | G06N 3/063 |
| 2018/0314921 A1* | 11/2018 | Mercep | G06T 7/55 |
| 2020/0134510 A1* | 4/2020 | Basel | G06N 3/084 |

* cited by examiner

ACTIVITY RECOGNITION METHOD WITH AUTOMATIC TRAINING BASED ON INERTIAL SENSORS

BACKGROUND

Technical Field

The present disclosure generally relates to electronic devices and, more specifically, to electronic devices employing inertial sensors to determine movement activities of the electronic device.

Description of the Related Art

Many mobile electronic devices, such as smartphones, include one or more inertial sensors to detect movement of the electronic device. The inertial data obtained from the inertial sensors can be used to rotate the display screen, control application functionality (e.g., control a character in a video game application), "wake up" the device, etc. The inertial data can also be used to determine one or more movement activities of the user while the user is holding the electronic device. For example, the inertial data can be used to determine if the user is not moving, walking, or running. This type of movement activity can be determined based on the characteristics of the inertial data, such as the frequency and amplitude of specific inertial data. Such movement activity determinations can be used to improve interactions between the user and electronic device.

Typically, a classifier is employed to learn which combinations of inertial data characteristics can be used to define each type of movement activity. The classifier analyzes inertial data from multiple different users and groups or classifies the inertial data into distinct groups or classes. Each distinct class is defined by a specific combination of inertial data characteristics and represents a distinct type of movement activity. For example, a classifier may identify a first class for non-movement as accelerometer data below a first threshold; a second class for walking as accelerometer data above the first threshold and below a second threshold; and a third class for running as accelerometer data above the second threshold. Thus, the classifier utilizes large amounts of training data to learn or identify the different threshold levels and thus define the different classes that represent the different types of movement activity.

The accuracy of classifiers is generally tied to the amount of training data, such that the more training data utilized, the more accurate the classifier. Analyzing such large amounts of data, however, can be computationally expensive and consume a lot of power, which may be unobtainable or inefficient if performed by a mobile electronic device. Moreover, the classes identified by a classifier are often generalized for the entirety of the training data, which can result in the learned classes being inaccurate for some individuals. It is with respect to these and other considerations that the embodiments described herein have been made.

BRIEF SUMMARY

A device may be summarized as including an inertial sensor, which, in operation, generates inertial sensor data associated with the device; and processing circuitry communicatively coupled to the inertial sensor, wherein the processing circuitry, in operation: determines a new feature array from the inertial sensor data; determines if the new feature array is within an existing class within a state space associated with the inertial sensor data; in response to the new feature array being included in the existing class, adds the new feature array to the existing class and updates a representation of the existing class in the state space based on the new feature array and an existing representation of the existing class; in response to the new feature array not being included in the existing class, creates a new class based on the new feature array.

The processing circuitry may, in operation, receive new inertial sensor data; select a class of a plurality of classes in the state space associated with the new inertial sensor data; and instruct the devise to perform an action in based on selected class. The processing circuitry may, in operation, determine if the new feature array is within the state space; and in response to the new feature array not being included in the state space, renormalize the state space based on the new feature array. The digital signal processing circuitry may, in operation, modify the representation of the existing class based on the renormalized state space. The processing circuitry may, in operation, rescale the existing class based on the renormalized state space. The digital signal processing circuitry may, in operation, rescale the existing class based on the adding of the new feature array to the existing class. The processing circuitry may, in operation, determine if the new feature array is within the state space; in response to the new feature array not being included in the state space, renormalize the state space based on the new feature array; modify a representation of two existing classes based on the renormalized state space; determine if the two existing classes meet an absorption criteria; and merge the two existing classes in response to the absorption criteria being met. The processing circuitry may, in operation, remove the existing class in response to a number of feature occurrences within the existing class being below a threshold value. The inertial sensor may include at least one of an accelerometer or gyroscope.

The processing circuitry may, in operation, determine if the existing class and the new class meet an absorption criteria; and merge the existing class and the new class in response to the absorption criteria being met.

The new feature array may include a peak-to-peak value and a standard deviation value associated with the inertial sensor data within a time window. An area of the new class may be defined by at least one predetermined value. An area of the existing class may be dynamically adjusted based on at least one Gaussian distribution associated with the existing class.

A system may be summarized as including an accelerometer, which, in operation, generates acceleration data; and one or more processors, which in operation, execute computer instructions to determine new feature values from the acceleration data; determine if the new feature values are within a state space associated with the acceleration data; in response to the new feature values being included in the state space, determine if the new feature values are within an existing class within the state space; in response to the new feature values being included in the existing class, add a new state-space point to the existing class based on the new feature values and update a representative point of the existing class in the state space based on the new state-space point and existing state-space points in the existing class; and in response to the new feature values not being included in the existing class, create a new class with a representative point in the state space based on the new feature values.

The one or more processors may, in operation, execute the computer instructions further to in response to the new feature values not being included in the state space, renormalize the state space based on the new feature values. The one or more processors may, in operation, execute the computer instructions further to modify the representative point of the existing class based on the renormalized state space. The one or more processors may, in operation, execute the computer instructions further to rescale the existing class based on the renormalized state space. The one or more processors may, in operation, execute the computer instructions further to rescale the existing class based on the addition of the new state-space point to the existing class.

The one or more processors may, in operation, execute the computer instructions further to in response to the new feature values not being included in the state space, renormalize the state space based on the new feature values; modify a representative point of two existing classes based on the renormalized state space; determine if the two existing classes meet an absorption criteria; and in response to the absorption criteria being met, merge the two existing classes into a new merged class with a new representative point in the state space based on existing state-space points in the two existing classes. The one or more processors may, in operation, execute the computer instructions further to remove the existing class in response to a number of state-space point occurrences within the existing class being below a threshold value. The one or more processors may, in operation, execute the computer instructions further to determine if the existing class and the new class meet an absorption criteria; and in response to the absorption criteria being met, merge the existing class and the new class with a new representative point in the state space based on existing state-space points in the existing class and the new state-space point.

A method may be summarized as including determining, using digital signal processing circuitry of a mobile device, a new feature array indicative of movement in the mobile device; determining if the new feature array is within a state space associated with the movement of the mobile device; in response to the new feature array not being included in the state space, renormalizing the state space based on the new feature array; determining if the new feature array is within a previous class within the state space; in response to the new feature array being included in the previous class, adding the new feature array to the previous class and updating a representation of the previous class in the state space based on the new feature array; and in response to the new feature array not being included in the previous class, creating a new class based on the new feature array.

The method may further include determining if two previous classes in the state space meet an absorption criteria; and merging the two previous classes in response to the absorption criteria being met.

The method may further include determining if the previous class and the new class meet an absorption criteria; and merging the previous class and the new class in response to the absorption criteria being met.

The method may further include removing the previous class in response to a number of feature occurrences within the previous class being below a threshold value.

BRIEF DESCRIPTION OF THE SEVERAL VIEWS OF THE DRAWINGS

Non-limiting and non-exhaustive embodiments are described with reference to the following drawings. In the drawings, like reference numerals refer to like parts throughout the various figures unless otherwise specified.

For a better understanding of the present disclosure, reference will be made to the following Detailed Description, which is to be read in association with the accompanying drawings.

DETAILED DESCRIPTION

Figure 1:
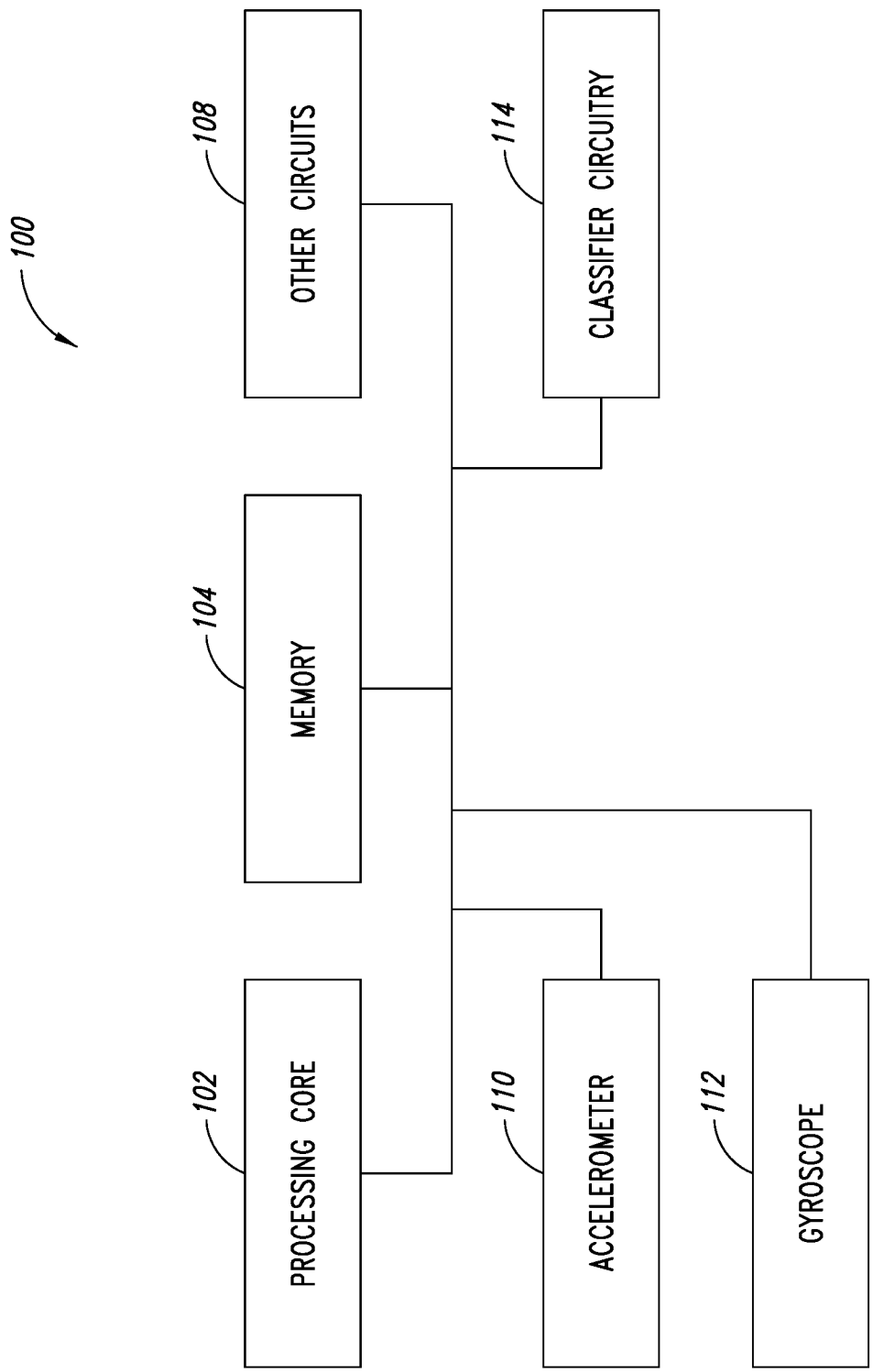
FIG. 1 shows a computing device, provided with accelerometers and gyroscopes and classifier circuitry, configured to calculate movement classes in real time.

In the following description, certain details are set forth in order to provide a thorough understanding of various embodiments of devices, systems, methods, and articles. One of skill in the art, however, will understand that other embodiments may be practiced without these details. In other instances, well-known structures and methods associated with, for example, circuits, such as transistors, multipliers, adders, dividers, comparators, transistors, integrated circuits, logic gates, finite state machines, accelerometers, gyroscopes, magnetic field sensors, memories, bus systems, etc., have not been shown or described in in detail in some figures to avoid unnecessarily obscuring descriptions of the embodiments.

Unless the context requires otherwise, throughout the specification and claims that follow, the word "comprise" and variations thereof, such as "comprising," and "comprises," are to be construed in an open, inclusive sense, that is, as "including, but not limited to."

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive, and allows for being based on additional features, functions, aspects, or limitations not described, unless the context clearly dictates otherwise. In addition, throughout the specification, the meaning of "a," "an," and "the" include singular and plural references. Furthermore, the particular features, structures, or characteristics may be combined in any suitable manner in one or more embodiments to obtain further embodiments.

The headings are provided for convenience only, and do not interpret the scope or meaning of this disclosure.

Briefly, embodiments are directed to a computing device that includes one or more inertial sensors to collect data and a processor or circuitry to perform real time classification of the inertial sensor data. The following is a brief introduction of feature arrays, state space, and classes, as used herein.

The computing device generates a feature array from the inertial sensor data. The feature array is a multi-dimensional array of inertial sensor data characteristic values. The inertial sensor data characteristics may include, but are not limited to, the peak-to-peak value, standard deviation, minimum, maximum, or other values or statistical representations of the inertial sensor data, or some combination thereof.

A state space is area defined from a starting data point (e.g., zero) to a maximum data point (e.g., a maximum feature array). Thus, the state space is a multi-dimensional area of inertial sensor data characteristics. A new data space is initially defined by the first feature array generated from the inertial sensor data—because the first feature array is the maximum feature array at that time. Subsequent feature arrays are added to the state space. If, however, a subsequent feature array falls outside the state space, then the state space is re-defined or renormalized based on that feature array (e.g., the state space is enlarged in each inertial sensor data characteristic dimension that exceeds the state space).

As feature arrays are added to the state space, classes within the state space are defined based on the position of the feature arrays relative to one another in the state space. Thus, a class is an area in the state space defined by a group or cluster of feature arrays. As new feature arrays are added to the state space, the position of one or more classes is modified (or classes are combined) based on the position of the new feature array and other feature arrays in the state space. Moreover, if the state space is renormalized, the relative position of the feature arrays and the classes in the state space are rescaled according to the renormalization of the state space.

Utilization of the embodiments described herein to renormalize the state space and define and redefine classes as inertial sensor data is received can improve the speed and efficiency of the computing device. For example, in various embodiments, the computing device is a mobile computing device (e.g., a cellular phone, a smart phone, a tablet, a laptop, or other personal computing device) with limited computing resources or limited electrical power properties compared to a server computer or cloud computing resources. Many previous classifiers and machine learning techniques involve complex computations and large amounts of data processing, which are often performed on server computers or cloud computing resources because of the large amounts of available computing resources and power. Attempts to implement these same previous classifiers on mobile computing devices can utilize too many computing resources and consume too much power, which results in a slow, inefficient, power-drained mobile computing device. But embodiments described herein allow for the efficient and automatic training and generation of classes for various activities, which improves the speed and efficiency of the computing device.

FIG. 1 shows a computing device 100 provided with an accelerometer 110, a gyroscope 112, a processing core 102, and classifier circuitry 114. The processing core 102 or the classifier circuitry 114, or some combination thereof, may perform embodiments described herein. Thus, in some embodiments where the processing core 102 performs the embodiments described herein, the classifier circuitry 114 may not be present in the computing device 100. Conversely, if the classifier circuitry 114 performs the embodiments described herein, the computing device 100 may still include the processing core 102 to perform other actions associated with the functioning of the computing device 100.

The accelerometer 110 or the gyroscope 112 are configured to sense movement or positional data associated with the computing device 100. The accelerometer 110 or the gyroscope 112, or both, may be implemented using MEMS or other technology. Although the computing device 100 is shown with both the accelerometer 110 and the gyroscope 112, embodiments are not so limited. Rather, in some embodiments, the computing device 100 may include only the accelerometer 110, only the gyroscope 112, or some other inertial sensor. The accelerometer 110 or the gyroscope 112 may be commonly referred to as inertial sensors that capture or sense inertial sensor data.

The processing core 102 may comprise, for example, one or more processors, a state machine, a microprocessor, a programmable logic circuit, discrete circuitry, logic gates, registers, etc., or various combinations thereof. The processing core 102 may control overall operation of the computing device 100, execution of applications programs by the computing device 100, etc.

The computing device 100 also includes one or more memories 104, such as one or more volatile and/or non-volatile memories, which may store, for example, all or part of instructions and data related to applications and operations performed by the system 100. For example, the memory 104 may store computer instructions that when executed by the processing core 102 perform the actions described herein.

In some embodiments, the computing device 100 includes one or more other circuits 108, which may include interfaces, transceivers, antennas, power supplies, etc. As mentioned above, the computing device 100 may also include classifier circuitry 114 that is configured to perform actions described herein, alone or in combination with the processing core 102.

The computing device 100 also includes a bus system, which may be configured such that the processing core 102, the memory 104, the accelerometer 110, the gyroscope 112, the classifier circuitry 114, and the other circuits 108 are communicatively coupled to one another to send or receive, or send and receive, data to or from other components. The bus system may include one or more of data, address, power, or control busses, or some combination thereof, electrically coupled to the various components of the computing device 100.

The computing device 100 may also include other sensors, not illustrated. Such other sensors may include, but are not limited to, a GPS system, a temperature sensor, a magnetism sensor, etc., or various combinations thereof.

Figure 2:
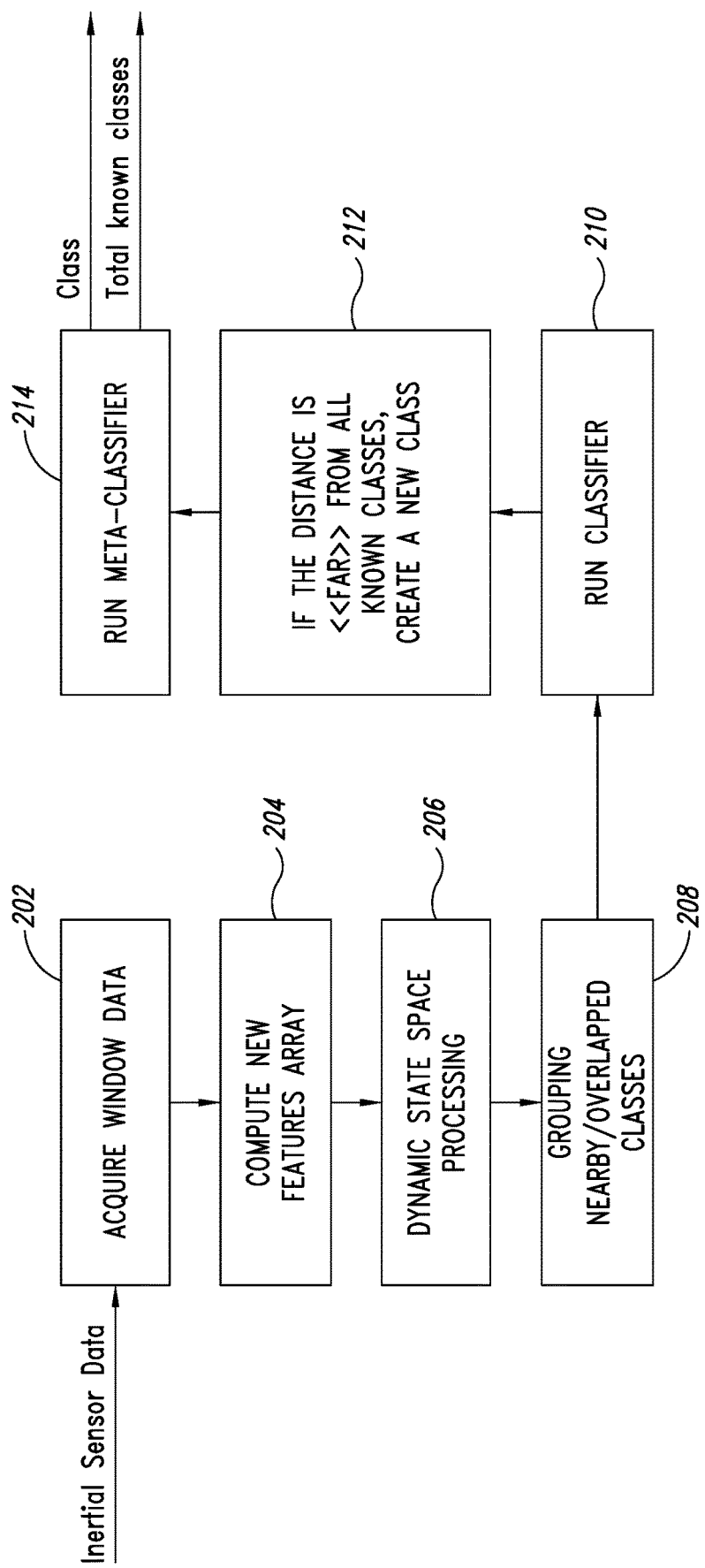
FIG. 2 shows a functional block diagram of a method implemented by the computing device in FIG. 1.

FIG. 2 shows a functional block diagram of a method implemented by the computing device 100 in FIG. 1. Embodiments of the overall functionality of computing device 100 are described in more detail elsewhere herein, but the example in FIG. 2 provides a brief illustrated example of such embodiments described herein. The illustrated example includes acquire window data functionality 202, compute new features array functionality 204, dynamic renormalization process 206, grouping nearby/overlapped classes functionality 208, classifier 210, create new class functionality 212, and meta-classifier 214. Each of these functions may be performed by one or more circuits, such as classifier circuitry 114 in FIG. 1, or by the processing core 102 in FIG. 1.

As mentioned above, a feature array is a multi-dimensional array of inertial sensor data characteristic values generated by from inertial sensor data sensed by inertial sensors on the computing device. The feature array is added to a state space, where a state space is a multi-dimensional area of inertial sensor data characteristics defined from a starting data point (e.g., zero) to a maximum data point (e.g., a maximum feature array). Moreover, classes within the state space are identified, where each class is an area in the state space defined by a group or cluster of feature arrays based on the position of the feature arrays relative to one another in the state space.

The acquire window data functionality 202 receives inertial sensor data from one or more inertial sensors (e.g., accelerometer data from the accelerometer 110 in FIG. 1 or gyroscope data from the gyroscope 112, or a combination thereof). The compute new features array functionality 204 generates a new feature array from the inertial sensor data.

The dynamic state space processing 206 generates or modifies a state space based on the new feature array. If the new feature array is a first feature array generated by the compute new features array functionality 204, then the dynamic state space processing 206 initializes the state space based on the new feature array. If the new feature array is not the first feature array, then the dynamic state space processing 206 determines if the new feature array is outside the current state space. If the new feature array is outside the current state space, the dynamic state space processing 206 renormalizes the state space based on the new feature array. The dynamic state space processing 206 may also renormalize the positioning of existing feature arrays and classes within the state space based on the renormalized state space.

The grouping nearby/overlapped classes functionality 208 groups existing classes that are now within some threshold distance or criteria from one other. The classifier 210 adds the new feature array to the state space. If the new feature array overlaps, or is within a predefined threshold distance from, an existing class, then the classifier 210 adds the new feature array to the existing class and modifies the accuracy of that class. If the new feature array exceeds the threshold distance from an existing class, then the created new class functionality 212 generates a new class in the state space for that new feature array. The meta-classifier 214 outputs the total known classes and associated information, such as if two classes were combined, a new class was added, or a refinement was made to an existing class.

The operation of one or more embodiments will now be described with respect to FIGS. 3 and 4, and for convenience will be described with respect to the embodiments of FIGS. 1 and 2 described above. In at least one of various embodiments, processes 300 and 400 described in conjunction with FIGS. 3 and 4, respectively, may be implemented by or executed on one or more computing devices, such as the computing device 100 in FIG. 1.

Figure 3:
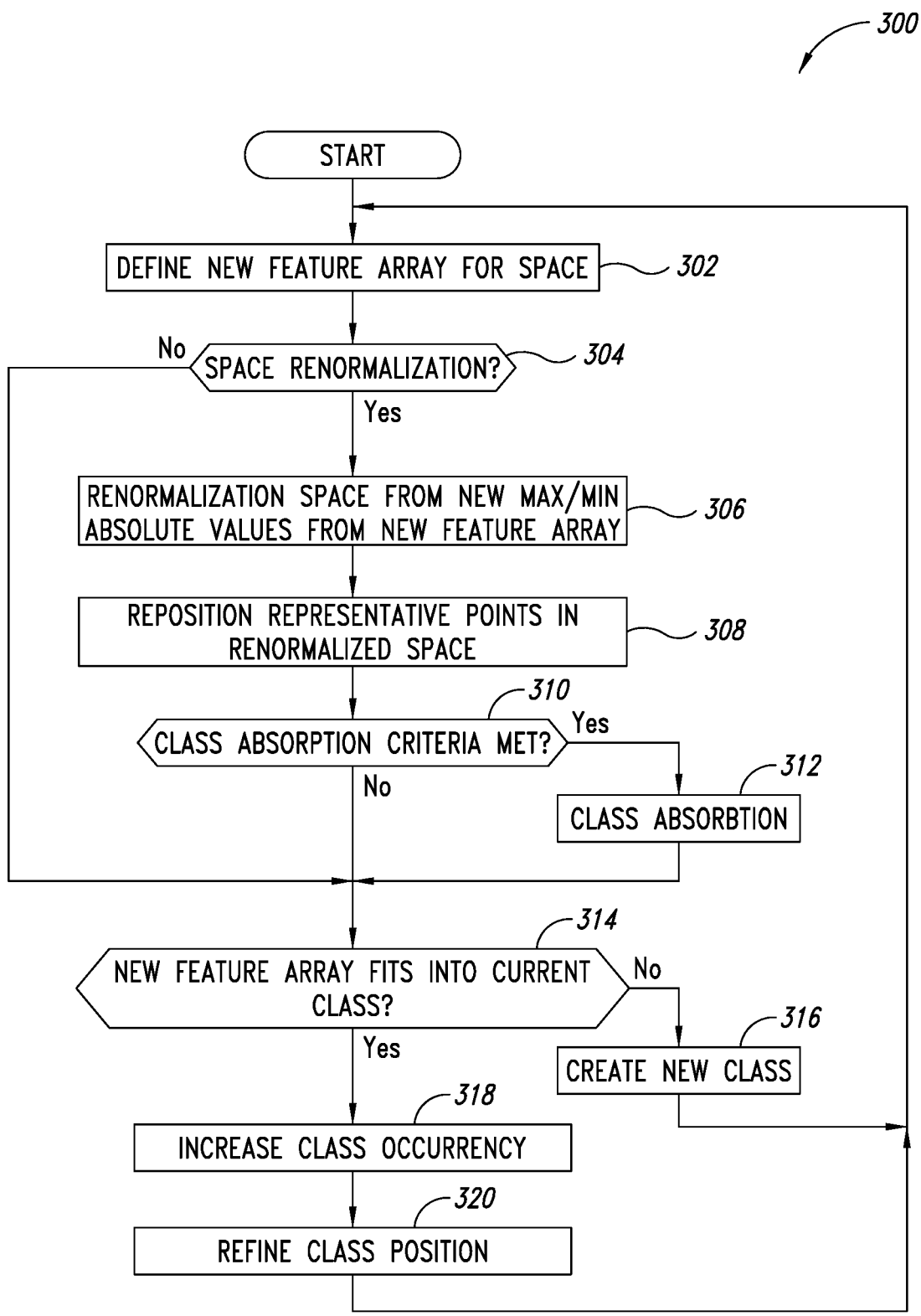
FIG. 3 shows a logical flow diagram of a process for calculating movement classes in real time.

FIG. 3 shows a logical flow diagram of a movement classifier process 300 for calculating movement classes in real time. The movement classifier process 300 begins, after a start block, at block 302, where the computing device defines a new feature array. In various embodiments, the new feature array is defined from accelerometer or gyroscope data, which may be referred to herein as inertial sensor data or movement data. The inertial sensor data may be captured over time for a given time period. For example, inertial sensor data may be captured at a data rate of 25 Hz (e.g., every 40 msec) for 70 samples. These 70 samples provide the data window for feature evaluation. In this example, a feature array is calculated for every 70 samples or once every 2.8 seconds (40 msec×70).

Various different statistical analyses may be performed on the inertial sensor data for a given sample window to generate two or more features for the new feature array. The two or more features of the feature array may include, but are not limited to, peak-to-peak value (e.g., value between the minimum sensor value and the maximum sensor value sensed during the sample window), minimum value (e.g., minimum sensor value sensed during the sample window), maximum value (e.g., maximum sensor value sensed during the sample window), standard deviation (e.g., standard deviation of the values sensed during the sample window), or other statistical values. In one non-limiting example, the new feature array may include the peak-to-peak value and standard deviation of a given sample window to create a two-dimensional feature array. Other embodiments may utilize different numbers of features in the new feature array to create other multi- or hyper-dimensional state spaces. Similarly, each separate feature of the feature array may include various different statistical values (as mentioned above) or they may be statistical values from different sensors (e.g., one feature of the feature array may be the standard deviation in the sensed values from an accelerometer and the other feature of the feature array may be the standard deviation in the sensed values from a gyroscope), or other variations or combinations thereof.

Once the new feature array values are calculated from the received inertial sensor data, they are normalized to the current state space so that the new feature array can be compared to the current state space. It should be noted that the new feature array may be within the state space or it may be outside the state space. For example, in one non-limiting example where the state space is two-dimensional, the normalized state space may be defined as point 0,0 to point 1,1 or point 0,0 to point 100,100, where point 1,1, or point 100,100, point corresponds to previously captured maximum (or minimum) feature values. Thus, the new feature array values can be normalized relative to the current state space based on the known previously captured maximum (or minimum) feature values and the normalized state space. For convenience, the new feature array normalized relative to the state space will be referred to as the new feature array. It should be noted that other normalized values may also be used.

Process 300 proceeds to decision block 304, where computing device determines whether the state space is to be renormalized. In various embodiments, this determination is based on whether the new feature array is within or outside the current state space. In various embodiments, the new feature array is compared to the current state space. If the new feature array is within the current state space, then the state space is not renormalized, but if the new feature array is outside the current state space, then the state space is to be renormalized. If the new feature array is the first feature array, then it will be used to define the state space. If the state space is to be renormalized, then process 300 flows to block 306; otherwise, process 300 flows to decision block 314.

At block 306, the state space is renormalized relative to the new feature array. If the absolute value of any feature in the new feature array is outside the current state space for the same corresponding feature, then that feature is normalized as the new maximum value (or minimum value depending on the feature) for the renormalized state space. Thus, one or more features from the new feature array are used as the new maximum (or minimum) for the corresponding feature in the normalized state space, which is based on whether the one or more features are greater (or less) than the absolute value of the corresponding feature in the current state space.

Continuing the two-dimensional example above where the state space is defined from point 0,0 to point 100,100, if the new feature array values are both greater than the current state space, then the new feature array values are normalized to be 100,100 in the renormalized state space. If only one feature of the new feature array values are identified as being greater that the corresponding feature in the current state space, then that feature value is normalized to be the maximum (i.e., 100) for that corresponding feature in the renormalized state space. Because the state space can include multiple dimensions, each feature value in the new feature array that is outside the state space is used to renormalize the state space.

Process 300 continues at block 308, where the computing device repositions the representative points of existing classes within the state space in the renormalized state space. In various embodiments, the representative points are identified as a normalized feature array that is a center point of an existing class based on the state space. The representative points may be previous feature arrays or they may be mathematical representations of the center of existing classes. For example, if an existing class is identified as a single previous feature array, then the existing class's representative point is that previous feature array. However, if the exiting class comprises two previous feature arrays, then an average between the two previous feature arrays may be identified as the existing class's representative point. Various embodiments described herein may utilize k-means or k-nearest neighbor techniques to define a representative point of an existing class.

After the current state space is renormalized at block 306, the representative points of existing classes are modified based on the new or renormalized state space. For example, the representative points are normalized with the state space by modifying their position within the renormalized state space based on a ratio of change for each feature between the previous state space and the renormalized state space.

Process 300 proceeds next to decision block 310, where the computing device determines whether a class absorption criteria is met. Because the position of representative points of existing classes (i.e., renormalized classes) may change within the renormalized state space, the distance between existing classes may also change. In various embodiments, the class absorption criteria may include overlapping classes, classes with representative points that are within a threshold distance of one another, etc. If two or more renormalized classes meet the class absorption criteria, then process 300 flows to block 312; otherwise, process 300 flows to decision block 314.

At block 312, the computing device merges the renormalized classes that meet the class absorption criteria together. In various embodiments, the merging, or absorption of classes may be the average between the representative points of those representative classes, similar to the modification of a class between a previous representative point and a new feature array, as discussed below with respect to block 320. After block 312, process 300 proceeds to decision block 314.

If, at decision block 310, no absorption criteria is met, or after block 312, process 300 continues at decision block 314. At decision block 314, the computing device determines whether the new feature array falls within an existing class. As mentioned above, an existing class is centered about a representative point. In some embodiments, the size and shape of each class may be static and predetermined, such as a circle with a given radius (e.g., if the state space is identified as point 0,0 to point 100,100 then the given radius may be 3, or some other predetermined value). In other embodiments, the radius may dynamically change based on the number of feature arrays in a given class or based on other characteristics of the feature arrays in the state space, which is discussed in more detail below with respect to FIG. 4.

In various embodiments, the new feature array is compared to the existing classes (i.e., is the new feature array within the area defined around a representative point of an existing class?) in the state space. If the new feature array does not fall into an existing class, then process 300 flows to block 316; otherwise, process 300 flows to block 318.

At block 316, the computing device creates a new class for the new feature array. In various embodiments, the new feature array is identified as the representative point of the new class in the state space, with its size and shape predetermined. After block 316, process 300 loops to block 302 to receive a new feature array.

If, at decision block 314, the new feature array falls into an existing class, then process 300 flows from decision block 314 to block 318. At block 318, computing device increases the class occurrency into which the new feature array falls.

Process 300 proceeds next to block 320, where the computing device refines the class position. In various embodiments, the refinement of the class position includes averaging or performing k-means or k-nearest neighbor techniques to update the representative point of that class.

In at least one embodiment, the representative point of the class is modified as a weighted sum of the occurrences (i.e., the feature arrays) in the class:

$$P_{new} = \frac{d + w_{old} P_{old}}{w_{old} + 1}$$

where,
d is the distance between $P_{old}$ and the new point (i.e., the new feature array);
$P_{new}$ is the new center position of the representative point;
$w_{old}$ is the number of occurrences excluding the new point in the class; and
$P_{old}$ is the previous center position of the class.

After block 320, process 300 loops to block 302, where the computing device receives a new feature array.

Figure 4:
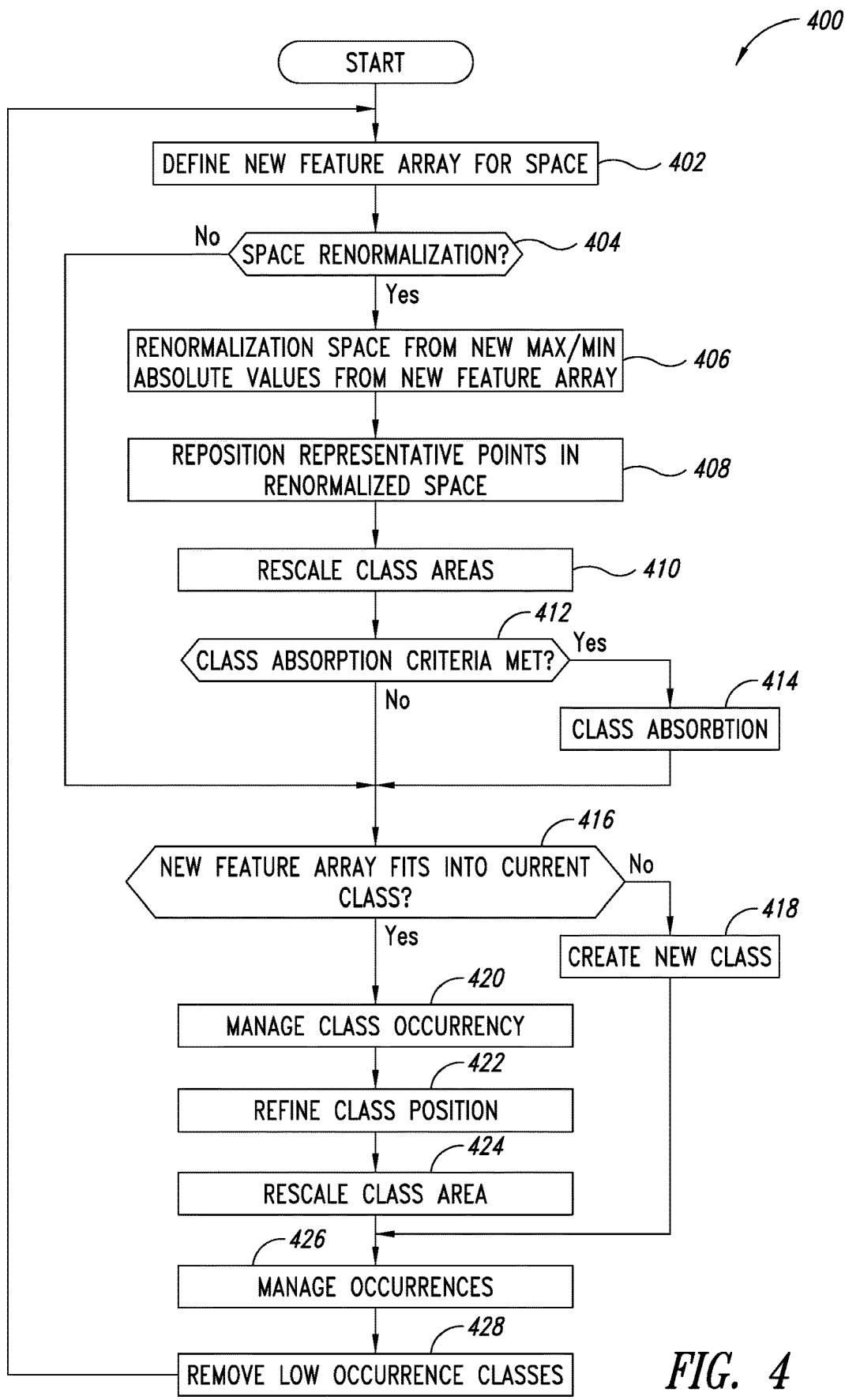
FIG. 4 shows a logical flow diagram of an alternative process for calculating movement classes in real time.

FIG. 4 shows a logical flow diagram of an alternative process for calculating movement classes in real time. Process 400 begins, after a start block, at block 402, where a new feature array is defined. In various embodiments, block 402 includes various embodiments described above with respect to block 302 in FIG. 3.

Process 400 proceeds to decision block 404, where the computing device determines whether the state space is to be renormalized. In various embodiments, block 404 includes various embodiments described above with respect to block 304 in FIG. 3. If the state space is to be renormalized, then process 400 flows to block 406; otherwise, process 400 flows to decision block 416.

At block 406, computing device renormalizes the state space relative to the new feature array. In various embodiments, block 406 includes various embodiments described above with respect to block 306 in FIG. 3.

Process 400 continues at block 408, where the computing device repositions the representative points of existing classes within the state space in the renormalized state space.

In various embodiments, block 408 includes various embodiments described above with respect to block 308 in FIG. 3.

Process 400 proceeds next to decision block 410, where the computing device rescales the areas of existing classes for the renormalized state space, which may be based on a ratio of change to the state space.

Process 400 proceeds next to decision block 412, where the computing device determines whether a class absorption criteria is met. In various embodiments, decision block 412 includes various embodiments described above with respect to block 310 in FIG. 3. In other embodiments, the class absorption criteria may be identified based on an overlap of two or more classes or it may be based on an overlapping of a double of the current radius of two or more classes.

If two or more renormalized classes meet the class absorption criteria, then process 400 flows to block 414; otherwise, process 400 flows to decision block 416.

At block 414, the computing device merges the renormalized classes that meet the class absorption criteria together. In various embodiments, block 414 includes various embodiments described above with respect to block 312 in FIG. 3. In some embodiments, additional techniques may be employed to compute the radius of the merged classes and may take into account various aspects of the system, including time evolution of the system, application, class priorities, etc.

In one embodiment, the new radius is calculated as:

$$R_{new} = \max(R_1, R_2)$$

where,
$R_{new}$ is the radius of the merged class;
$R_1$ is the radius of a first class; and
$R_2$ is the radius of a first class.

In another embodiment, the new radius may be calculated as:

$$R_{new} = \sqrt{\frac{w_1 R_1^2 + w_2 R_2^2}{w_1 + w_2}}$$

where,
$R_{new}$ is the radius of the merged class;
$R_x$ is the radius of x class; and
$w_x$ is the number of occurrences of x class.

After block 414, process 400 proceeds to decision block 416.

If, at decision block 412, no absorption criteria is met, or after block 414, process 400 continues at decision block 416. At decision block 416, the computing device determines whether the new feature array falls within an existing class. In various embodiments, decision block 416 includes various embodiments described above with respect to block 314 in FIG. 3. In other embodiments, the new feature array falls within an existing class if it is within x times (e.g., 3 times) the area of an existing class. If the new feature array does not fall into an existing class, then process 400 flows to block 418; otherwise, process 400 flows to block 320.

At block 418, the computing device creates a new class for the new feature array. In various embodiments, block 418 includes various embodiments described above with respect to block 316 in FIG. 3. In some embodiments, the new class is created if the new feature array far from the nearest class defined as:

$$d(P_{new}, P_{class}) > 3R$$

where,
$P_{new}$ is the new feature array;
$P_{class}$ is the representative point of the nearest class; and
R is the radius of the nearest class.

In some embodiments, the radius of the new class may be initially set to zero, but is evaluated and modified in response to additional new feature arrays being added to the state space near the new class.

After block 418, process 400 proceeds to block 426.

If, at decision block 416, the new feature array falls into an existing class, then process 400 flows from decision block 416 to block 420. At block 420, the computing device increases the class occurrency into which the new feature array falls. In various embodiments, block 420 includes various embodiments described above with respect to block 318 in FIG. 3.

Process 400 proceeds next to block 422, where the computing device refines the class position. In various embodiments, block 422 includes various embodiments described above with respect to block 320 in FIG. 3.

Process 400 continues at block 424, where the computing device rescales the area of existing class that includes the new feature array. In some embodiments, the radius of the existing class may be refined as:

$$R_{new} = \sigma d + (1-\sigma) R_{old}$$

where,
$R_{new}$ is the new radius of the class;
$R_{old}$ is the previous radius of the class;
d is the distance between the representative point of the nearest class and the new feature array; and
$\sigma$ is a number $0<\sigma<1$ in the function of the system time evolution.

As new feature arrays are added to the state space, the radius of classes can dynamically increase or decrease based on the occurrences of the feature arrays in a given class.

After block 424 or after block 418, process 400 proceeds to block 426, where the computing device manages occurrences. In various embodiments, occurrences are decreased slowly compared to the system evolution. For example, the occurrences can be decreased every hour. This allows for occurrences in stale classes (i.e., classes that are not being added to or modified with new feature arrays) to slowly be reduced, which can ultimately lead to the stale class being removed in block 428.

Process 400 continues next at block 428, where the computing device removes low occurrence classes. In various embodiments, low occurrence classes may include classes that have less than a threshold number of feature arrays for a predetermined time. For example, if a class has less than 5 occurrences over a 5-minute interval, then that class may be removed. Other numbers of occurrences or criteria may also be used to determine if a class is to be removed.

After block 428, process 400 loops to block 402, where the computing device receives a new feature array.

Process 300 in FIG. 3 or process 400 in FIG. 4 may continue for a select number of new feature arrays or for a select amount of time, which may be referred to as the training period or training time period. This type of training allows for the real time or automatic recognition of activities for a particular user.

During the training period or once the training period has ended, the computing device can utilize the existing state space and the existing classes to perform other actions, such as to cause an application executing on the computing device to perform a select action, based on new or target inertial sensor data captured by the inertial sensors.

For example, after the training is complete, target inertial sensor data may be captured by the inertial sensors of the computing device. A target feature array is generated from the target inertial sensor data and compared to the existing classes in the state space. If the target feature array falls into an existing class, then the computing device may take action. For example, if the target feature array falls into an existing class associated with the user walking, then the computing device may cause an application to record the steps taken by the user. As another example, if the target feature array falls into another existing class associated with the user being still, then the computing device may output an alert to inform the user that they have stopped moving. Various other types of actions may be performed by the computing device in response to a target feature array falling into an existing class.

Figure 5:
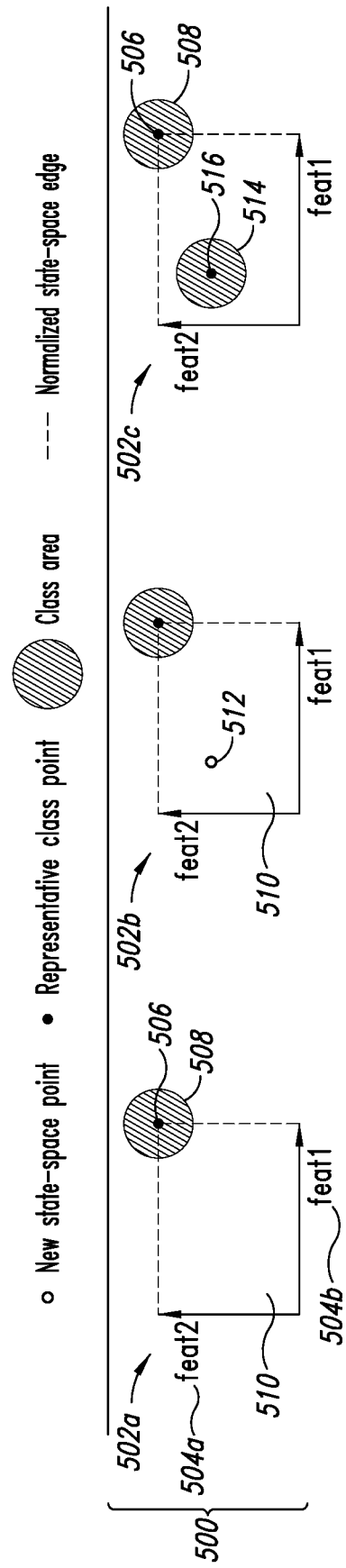
FIGS. 5-7 show use case examples of defining and modifying classes as additional data is received.
Figure 6:
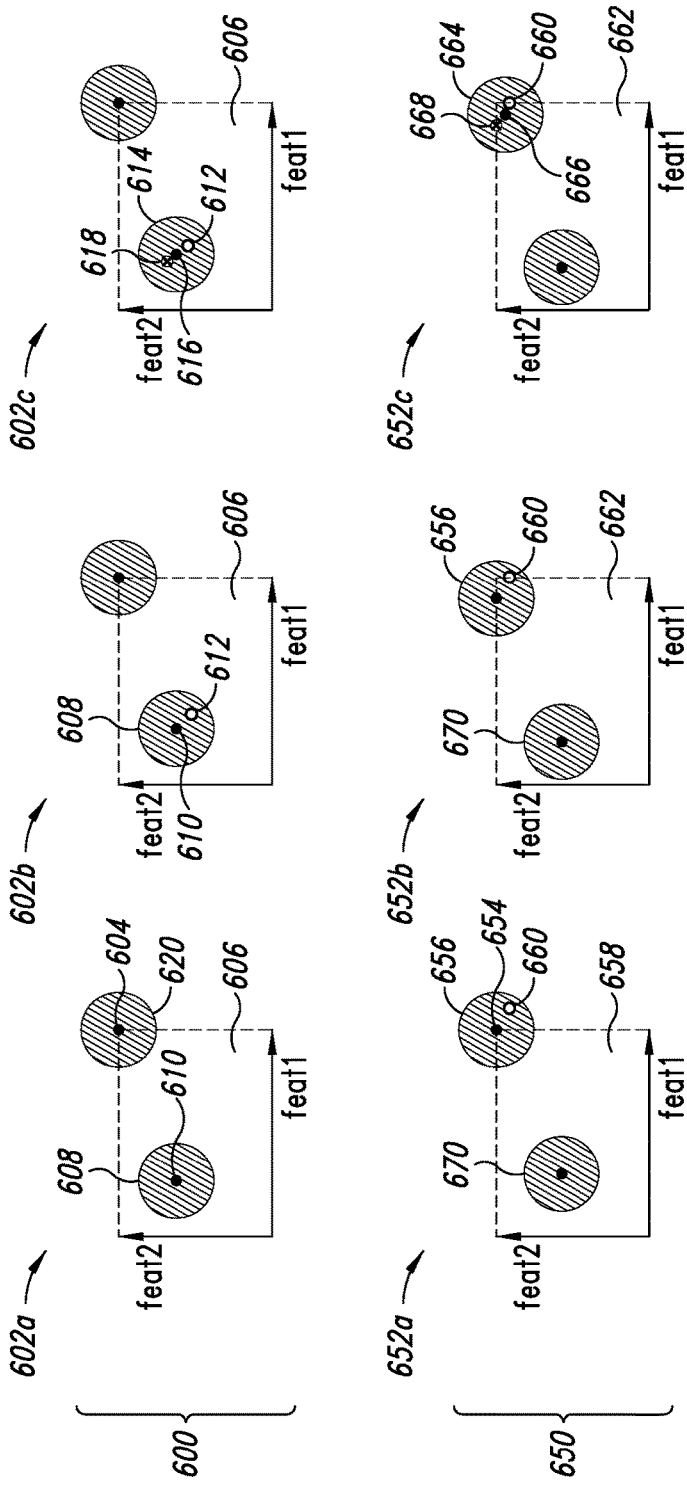
Figure 7:
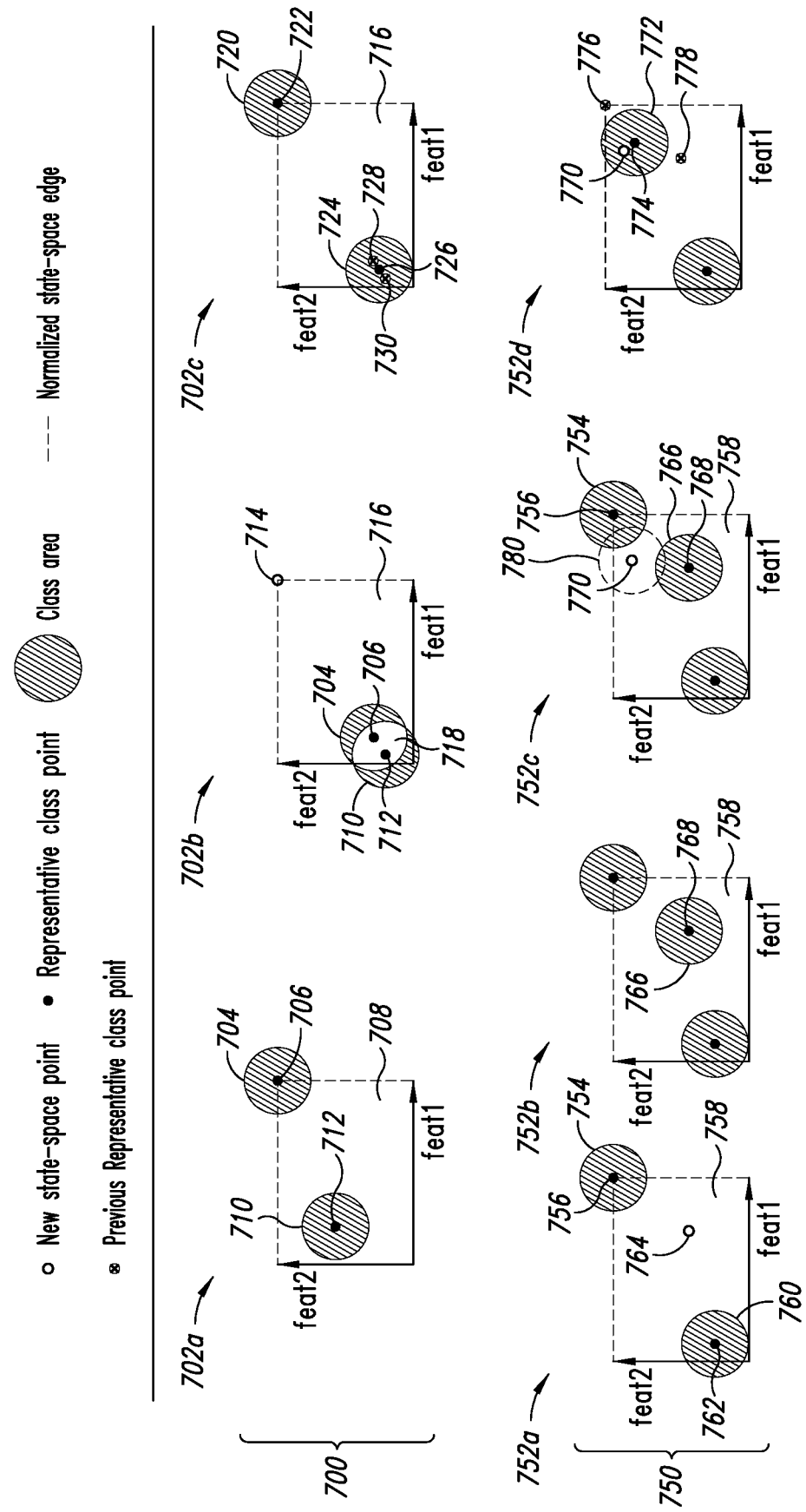

FIGS. 5-7 show use case examples of defining and modifying classes as additional inertial sensor data is received. In particular, FIG. 5 illustrates the addition of a new class to an existing state space. Scenario 500 in FIG. 5 illustrates example stages 502a-502c, which represent different stages of adding a new class to an existing state space.

Starting with example stage 502a, a state space 510 is defined from a null point (e.g., 0,0) to a maximum point (e.g., 100,100) for features 504a and 504b. In this example, the state space 510 is an existing state space with the maximum point being set at the position of the feature array with the maximum values for both feature 504a and feature 504b, which in this example is representative class point 506. The representative class point 506 represents or defines the center of existing class 508. Because representative class point 506 is the maximum point in the existing state space 510, a first portion of the class 508 is inside the state space 510 and a second portion of the class 508 is outside the state space 510.

Example stage 502b illustrates the addition of new state-space point 512 to the existing state space 510. The new state-space point 512 is defined from the normalization of a new feature array to the state space 510. As described herein, if the new state-space point 512 is outside of an existing class (e.g., class 506), then a new class 514 is defined for the new state-space point 512.

Example stage 502c illustrates the addition of new class 514 for the new state-space point 512. In this example, representative class point 516 is defined as the center of the new class 514. Because the new state-space point 512 is used to define the new class 514, the representative class point 516 is at the same position in the state space 510 as the new state-space point 512.

FIG. 6 illustrates two example scenarios, scenario 600 and scenario 650. Scenario 600 illustrates the modification of an existing class due to the addition of a new feature array, and scenario 650 illustrates the modification of the state space due to a new feature array being outside the existing state space.

Scenario 600 includes example stages 602a-602c, which illustrate the different stages of modifying an existing class. Starting with example stage 602a, a state space 606 is an existing state space with the maximum point being set at representative class point 604 of class 620. The state space 606 also includes class 608 defined by representative class point 610. In some embodiments, state space 606 illustrated in example stage 602a may be an embodiment of state space 510 illustrated in example stage 502c of example 500 in FIG. 5.

Example stage 602b illustrates the addition of new state-space point 612 (i.e., a new feature array) to the state space 606. In this example, the new state-space point 612 is within the state space 606 and within the existing class 608. As described herein, if the new state-space point 612 is within an existing class (e.g., class 608), then the positioning of the existing class is modified. As mentioned herein, the position of the existing class 608 may be modified based on the position of the representative class point 610 of the existing class 608 and the position of the new state-space point 612, such as an average position between the two points. It should be noted that as more points are added to an existing class, additional methods of determining a new representative class point of the modified class may be utilized, such as utilizing k-means or k-nearest neighbor techniques.

Example stage 602c illustrates the modified position of previous class 608, which is represented as modified class 614 with new representative class point 616. In this illustration, the new representative class point 616 is illustrated as being halfway between the previous representative class point 618 (i.e., representative class point 610 of class 608) and the new state-space point 612.

Scenario 650 includes example stages 652a-652c, which illustrate the different stages of renormalizing the state space. Starting with example stage 652a, a state space 658 is an existing state space with the maximum point being set at representative class point 654 of class 656. In some embodiments, state space 658 illustrated in example stage 652a may be an embodiment of state space 510 illustrated in example stage 502c of example 500 in FIG. 5. A new state-space point 660 is being added to the state space 658. However, the new state-space point 660 is outside of the state space 658. Thus, the state space 658 is to be renormalized based on the position of the new state-space point 660.

Example stage 652b illustrates renormalized state space 662 based on the new state-space point 660. In this example, the value of "feat1" for the new state-space point 660 exceeds the maximum value of "feat1" in the previous state space 658. Thus, the maximum value of "feat1" in the state space 658 is renormalized with respect to the "feat1" value of the new state-space point 660, while maintaining the maximum value of "feat2" in the state space 658 with respect to the "feat2" value of the representative class point 654, which results in the renormalized state space 662. Once the state space 658 is renormalized, the position of existing classes (e.g., class 670) within the renormalized state space 662 is modified based on the renormalized size of the renormalized state space 662.

Because the new state-space point 660 is within existing class 656, the position of class 656 is modified similar to what is described above with respect to scenario 600. Thus, example stage 652c illustrates the modified position of previous class 656, which is represented as modified class 664 with new representative class point 666. In this illustration, the new representative class point 666 is illustrated as being halfway between the previous representative class point 668 (i.e., representative class point 654 of class 656) and the new state-space point 660.

FIG. 7 also illustrates two example scenarios, scenario 700 and scenario 750. Scenario 700 illustrates the merging of existing classes due to a renormalized state space, and scenario 750 illustrates the merging of existing classes due to the addition of a new feature array being within a threshold distance from the existing classes.

Scenario 700 includes example stages 702a-702c, which illustrate the different stages of merging existing classes in response to a renormalized state space. Starting with example stage 702a, a state space 708 is an existing state space with the maximum point being set at representative class point 706 of class 704. The state space 708 also includes class 710 defined by representative class point 712. In some embodiments, state space 708 illustrated in example stage 702a may be an embodiment of state space 662 illustrated in example stage 652c of scenario 650 in FIG. 6.

Example stage 702b illustrates the addition of new state-space point 714 to the state space 708. In this example, however, the new state-space point 714 is outside the state space 708. Thus, as described herein, the state space 708 is renormalized as renormalized state space 716, which is based on the position of the new state-space point 714. In this example, the new state-space point 714 is very far outside of the state space 708. In renormalizing the state space 708 into the renormalized state space 716, the position of the representative class points 706 and 712 of classes 704 and 710, respectively, are also renormalized within the renormalized state space 716 based on the ratio of change from the state space 708 to the renormalized state space 716. In this example, the renormalized positions of representative class points 706 and 712 results in an overlap 718 of their respective classes 704 and 710.

When at least two classes overlap or otherwise meet some distance threshold criteria, then those classes are merged together, which is illustrated in example state 702c. Example stage 702c illustrates the merging of classes 704 and 710 into a new class 724. The representative class point 726 of the new class 724 is determined based on an average between the previous representative class points 728 and 730, or other k-means techniques. Moreover, a new class 720 is defined about representative class point 722, which is at the same position as the new state-space point 714.

Scenario 750 includes example stages 752a-752d, which illustrate the different stages of merging existing classes in response to the addition of additional feature arrays. Starting with example stage 752a, a state space 758 is an existing state space with the maximum point being set at representative class point 756 of class 754. The state space 758 also includes class 760 defined by representative class point 762. In some embodiments, state space 758 illustrated in example stage 752a may be an embodiment of state space 716 illustrated in example stage 702c of scenario 700.

A new state-space point 764 is being added to the state space 758. Because the new state-space point 764 is outside of the existing classes 754 and 760, a new class 766 is added to the state space 758, which is illustrated at example stage 752b. The new class 766 is defined by representative class point 768, which is at the same position as the new state-space point 764 in example stage 752a.

Example stage 752c illustrates the addition of yet another new state-space point 770 to the state space 758. In this example, however, the new state-space point 770 is positioned such that if a new class 780 is added with a representative class point at the same position as the new state-space point 770, then that new class 780 would overlap classes 754 and 766. Therefore, the position of representative class point 756, representative class point 768, and new state-space point 770 are averaged to create a new representative class point 774, which is illustrated in example stage 752d.

As shown in example stage 752d, a new class 772 is defined for the new representative class point 774. As a result, previous representative class points 776 and 778 are now outside the new class 772, but the new state-space point 770 is within the new class 772.

The above described examples illustrated in FIGS. 6 and 7 demonstrate the use of predefined class areas. Accordingly, the size of class area of each class is defined based on a predetermined size with the representative class point at the center of the class area. In other embodiments, dynamically sized or shaped class areas may also be implemented, as discussed herein.

Figure 8A:
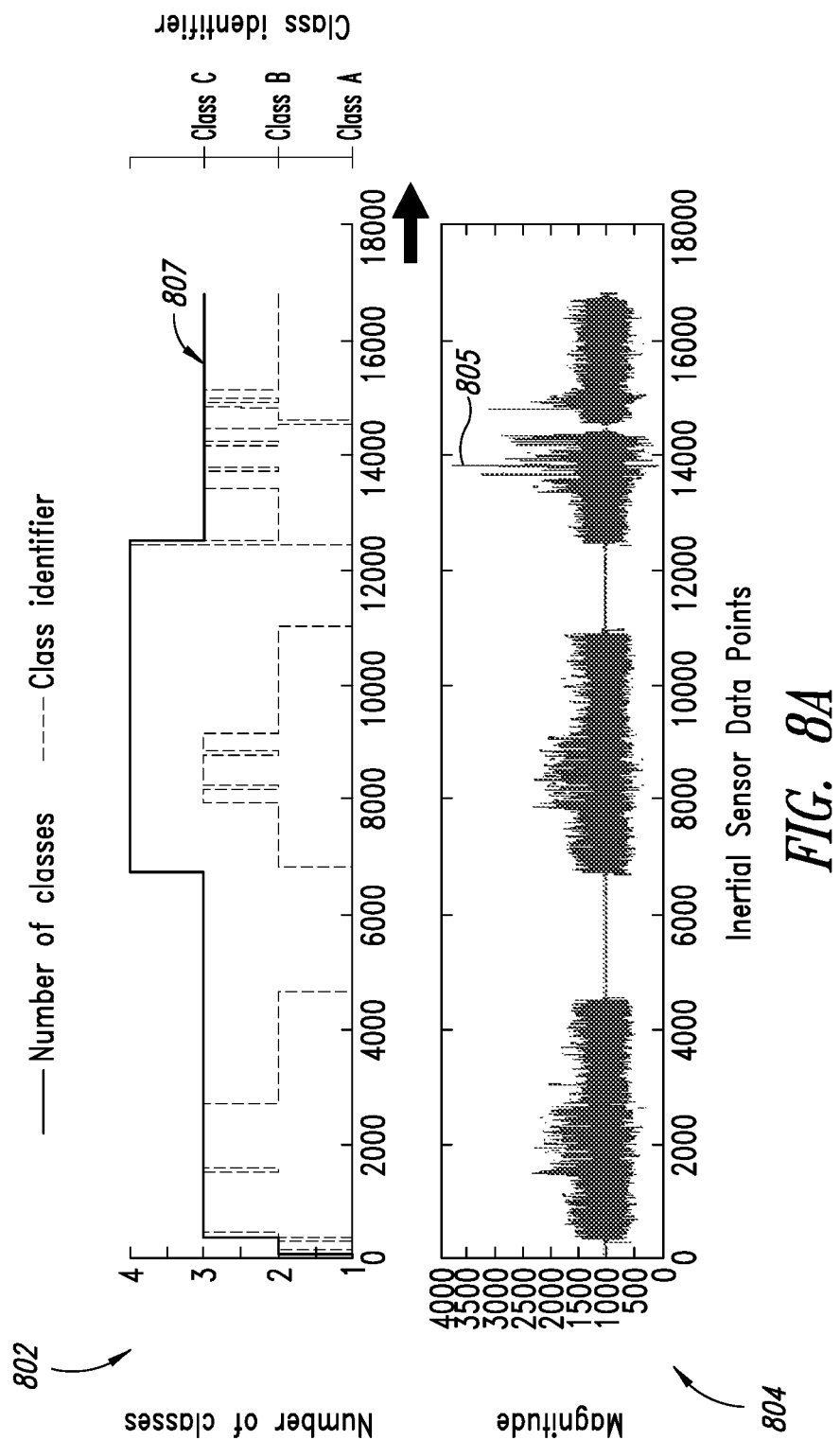
FIGS. 8A-8B, 9A-9B, 10A-10B, and 11A-11B show use case graphical examples of defining and modifying classes as inertial data is received.
Figure 8B:
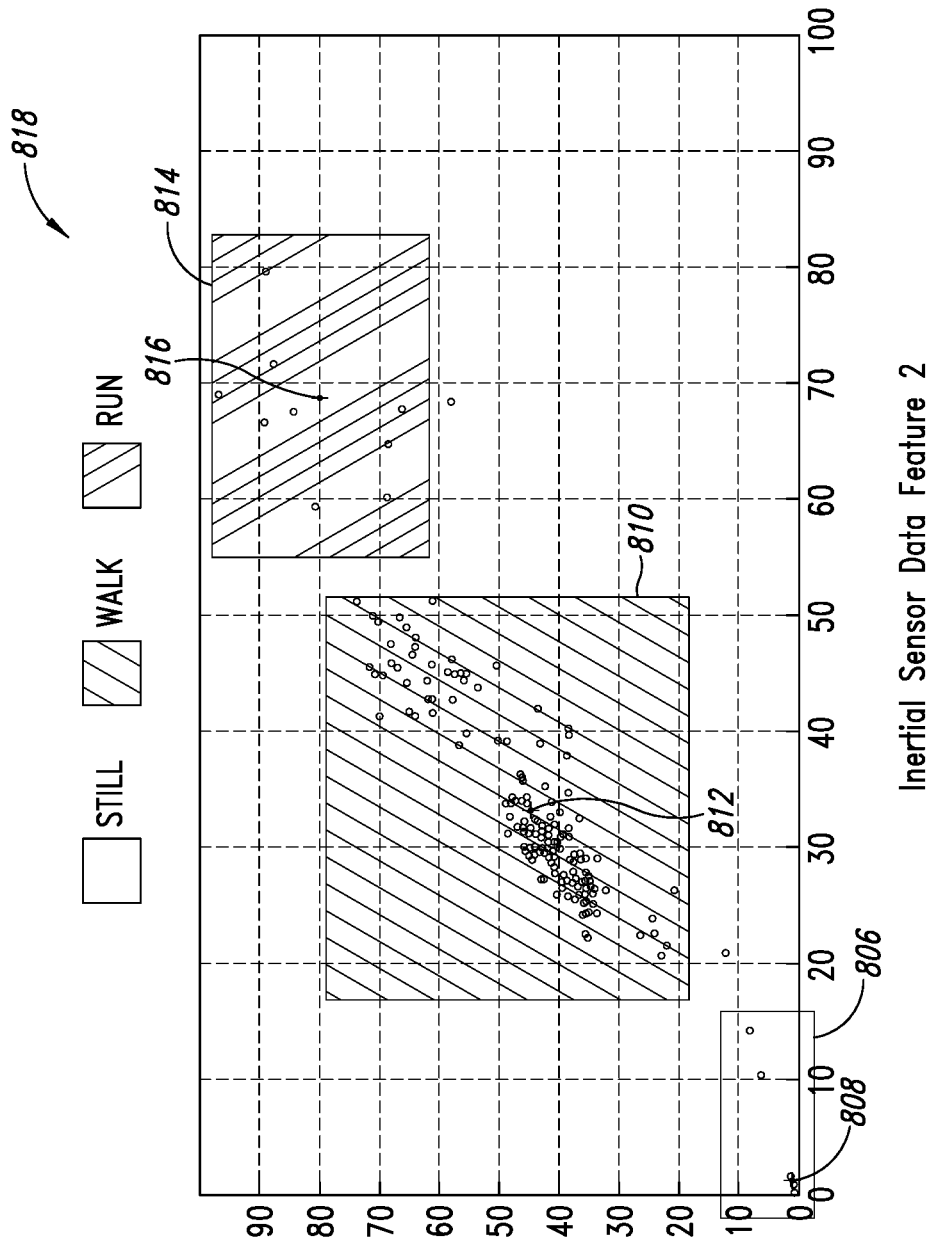

FIGS. 8A-8B and 9A-9B show use case graphical examples of defining and modifying classes as inertial data is received utilizing embodiments described herein. FIGS. 8A-8B utilize the same inertial sensor data as FIGS. 9A-9B, but employ different grouping criteria to define the classes. In particular, FIGS. 9A-9B utilize a grouping criteria that results in tighter clusters to define a class, compared to the grouping criteria in FIGS. 8A-8B.

FIGS. 8A-8B show use case graphical examples of defining and modifying classes as inertia sensor data is received. FIG. 8A illustrates the incoming inertial sensor data and the corresponding defining or re-defining of classes. And FIG. 8B illustrates a state space with feature arrays and classes for the inertial sensor data.

Graph 804 in FIG. 8A illustrates a magnitude of a plurality of inertial sensor data that is sensed by inertial sensors over time, as described herein. In one non-limiting example, this inertial sensor data may be accelerometer data.

Graph 802 illustrates the corresponding number of classes that have been discovered or otherwise defined over time as a result of the corresponding inertial sensor data, as described herein. The number of classes at any given point in time associated with the inertial sensor data points is illustrated by the solid line. In this example, a total of four classes are defined at one point in time, but after additional inertial sensor data is received, the system stabilizes at three classes.

Graph 802 also illustrates the corresponding class in which the incoming inertial sensor data is included when added to the state space, as described herein. This corresponding class is illustrated by the dashed line in graph 802. For illustrative purposes the resulting three classes have been labeled as "Class A," "Class B," and "Class C." For example, when inertial sensor data point 805 is received, it is added to "Class C," as indicated at reference 807. As the system defines, scales, and repositions the various classes, as described herein, a user or the computing device 102 can associate the various classes with different activities. For example, "Class A" may be associated with the user being still, "Class B" may be associated with the user walking, and "Class C" may be associated with the user running. These labels can be selected based on the magnitude of the inertial sensor data (e.g., if an average magnitude of the inertial sensor data in a class is above, below, or between one or more threshold values) or some other criteria.

FIG. 8B illustrates the resulting state space 818 defined by the inertial sensor data from FIG. 8A. In this example, the state space 818 is a two-dimensional state space with inertial sensor data feature 1 on the y-axis and inertial sensor data feature 2 on the x-axis. As described herein, the inertial sensor data is utilized to generate a feature array with these features, which can then be added to the state space 818. As additional feature arrays are generated for additional inertial sensor data, the state space 818 is renormalized and the classes are defined, scaled, and repositioned, as described herein. In this example, there are three resulting classes, 806, 810, and 814, with representative points 808, 812, and 816, respectively, within the state space 818. Classes 806, 810, and 814 represent "Class A," "Class B," and "Class C," respectively, in Graph 802 in FIG. 8A.

Figure 9A:
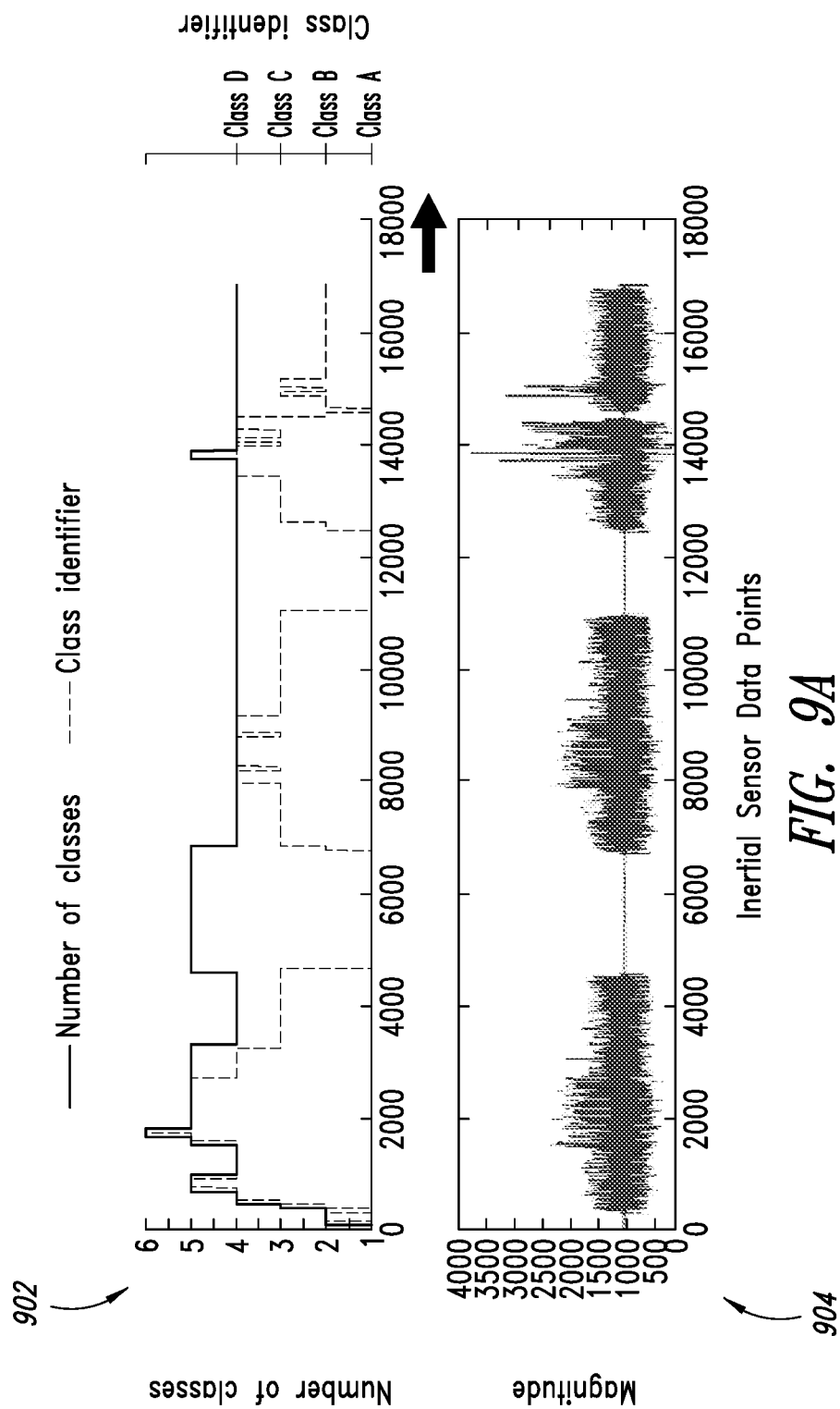
Figure 9B:
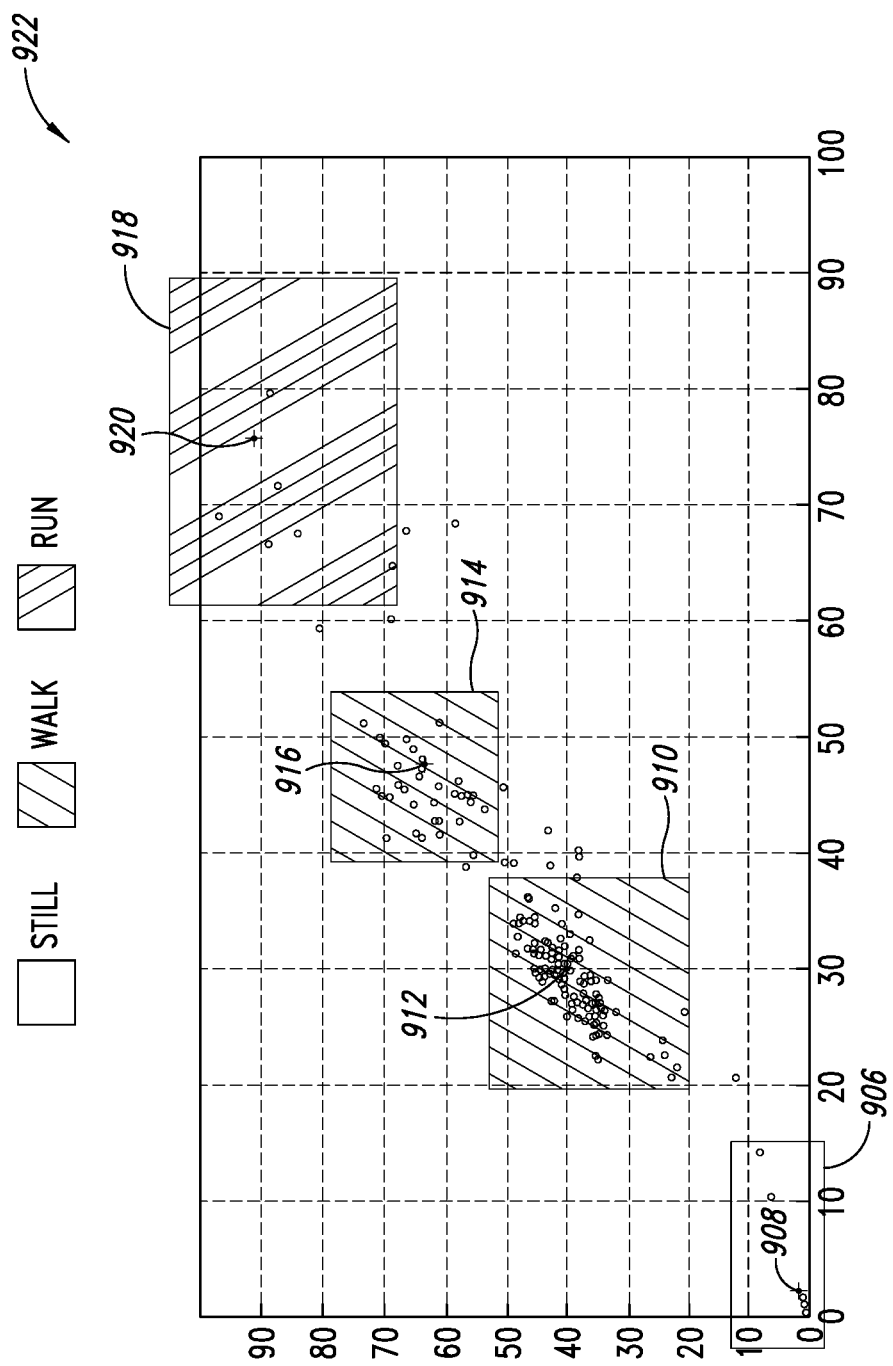

FIGS. 9A-9B are similar to FIGS. 8A-8B in that they show use case graphical examples of defining and modifying classes as inertial sensor data is received. FIG. 9A illustrates the incoming inertial sensor data and the corresponding defining or re-defining of classes. And FIG. 9B illustrates a state space with feature arrays and classes for the inertial sensor data. One non-limiting difference between FIGS. 9A-9B and FIGS. 8A-8B may be the utilization of different classification criteria, such as different class absorption or occurrence criteria.

Graph 904 in FIG. 9A illustrates a magnitude of a plurality of inertial sensor data that is sensed by inertial sensors over time, as described herein. Graph 902 illustrates the corresponding number of classes that have been discovered or otherwise defined over time as a result of the corresponding inertial sensor data, which is illustrated by the solid line. In this example, a total of six classes are defined at one point in time, but after additional inertial sensor data is received, the system stabilizes at four classes.

Graph 902 also illustrates the corresponding class in which the incoming inertial sensor data is included when added to the state space, which is illustrated by the dashed line. For illustrative purposes the resulting four classes have been labeled as "Class A," "Class B," "Class C," and .Class D." As described above, as the system defines, scales, and repositions the various classes, a user or the computing device 102 can associate the various classes with different activities. For example, "Class A" may be associated with the user being still, "Class B" and "Class C" may be associated with the user walking, and "Class D" may be associated with the user running. Again, these labels can be selected based on the magnitude of the inertial sensor data (e.g., if an average magnitude of the inertial sensor data in a class is above, below, or between one or more threshold values) or some other criteria.

FIG. 9B illustrates the resulting state space 922 defined by the inertial sensor data from FIG. 9A. In this example, there are four resulting classes, 906, 910, 914, and 920, with representative points 908, 912, 916, and 920, respectively, within the state space 922. Classes 906, 910, 914, and 918 represent "Class A," "Class B," "Class C," and "Class D," respectively, in Graph 902 in FIG. 9A.

FIG. 9B illustrates the resulting classes of the data illustrated in FIG. 9A. In this example, there are four resulting classes, 906, 910, 914, and 918, with representative points 908, 912, 916, and 920, respectively.

Figure 10A:
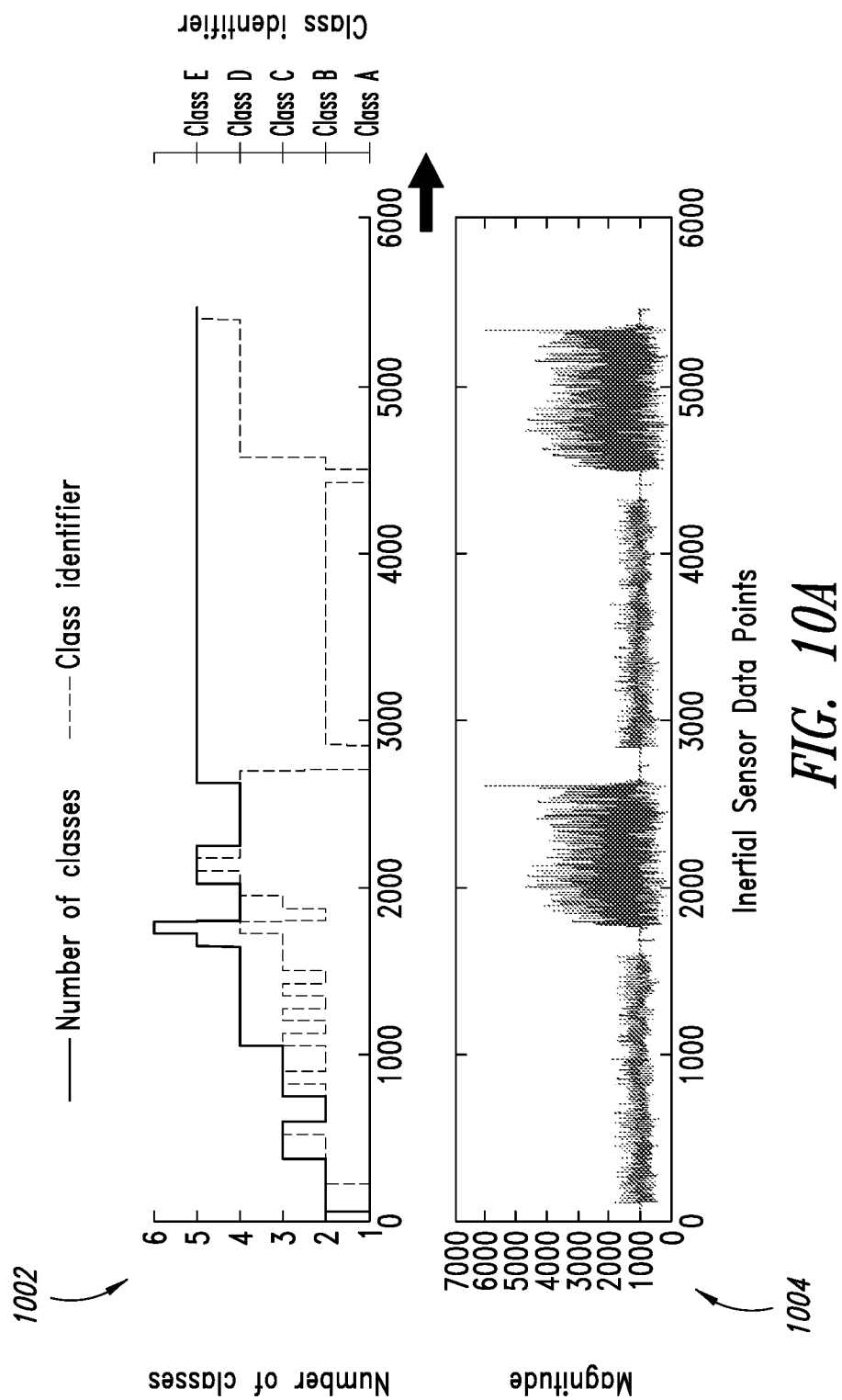

FIGS. 10A-10B and 11A-11B illustrate yet additional examples of inertial sensor data and the resulting classes being defined utilizing embodiments described herein. For example, FIG. 10A illustrates graphs 1002 and 1004 to show inertial sensor data and the defining and redefining of classes over time, which are similar to graphs 802 and 804, respectively, in FIG. 8A. In this example, "Class A" may be associated with the user being still, "Class B" and "Class C" may be associated with the user walking, and "Class D" and "Class E" may be associated with the user running.

Figure 10B:
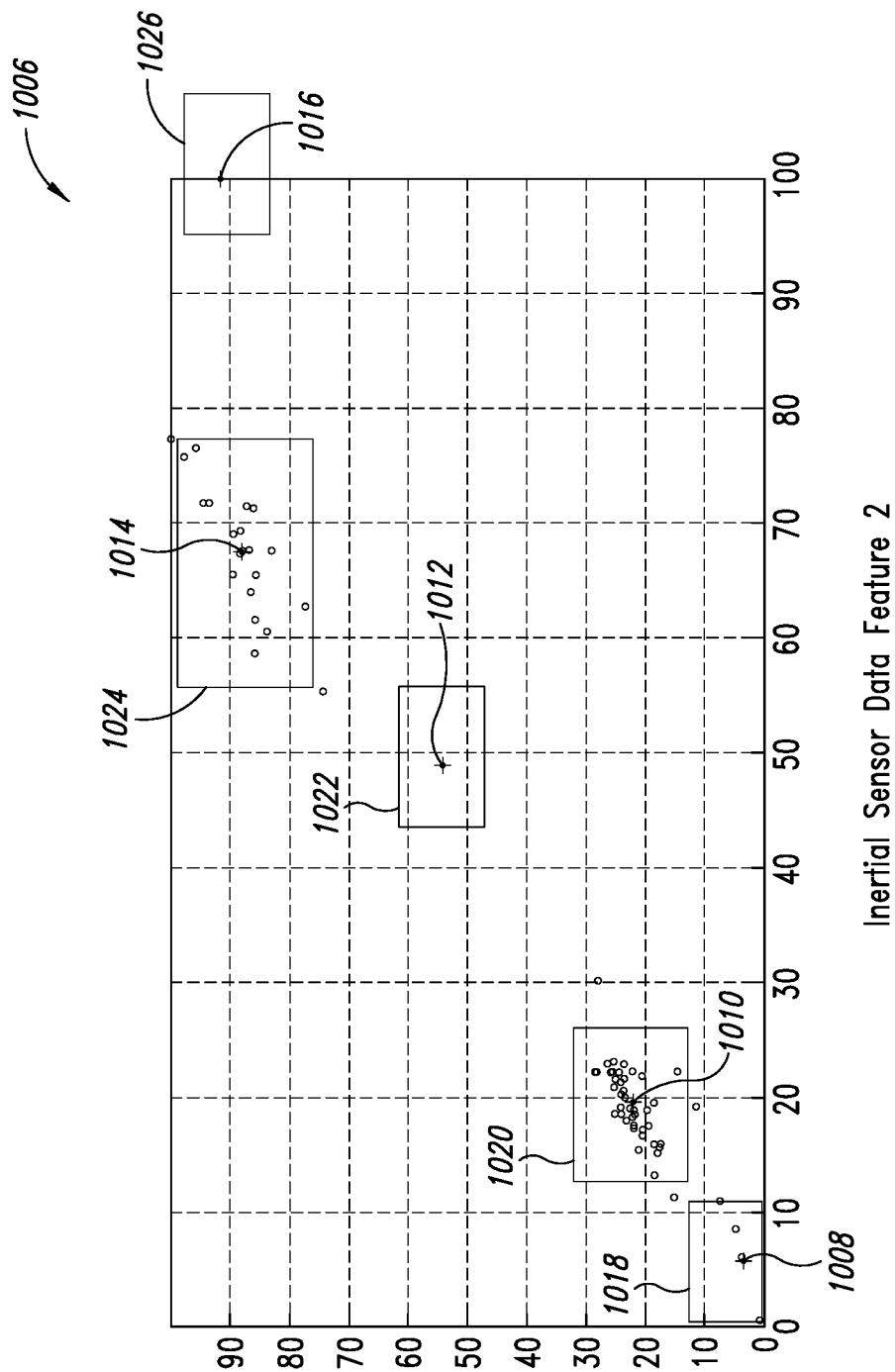

FIG. 10B illustrates a state space 1006 generated from the inertial sensor data identified in FIG. 10A. In this example, there may be five identified classes 1018, 1020, 1022, 1024, and 1026, with representative points 1008, 1010, 1012, 1014, and 1016, respectively, within the state space 1006. In this example, representative points 1012 and 1016 may be considered outliers because there are no other feature arrays within a selected area from the representative points. Accordingly, the corresponding classes 1022 and 1026 may be defined as a particular area, independent of the other feature arrays in the state space 1006.

Figure 11A:
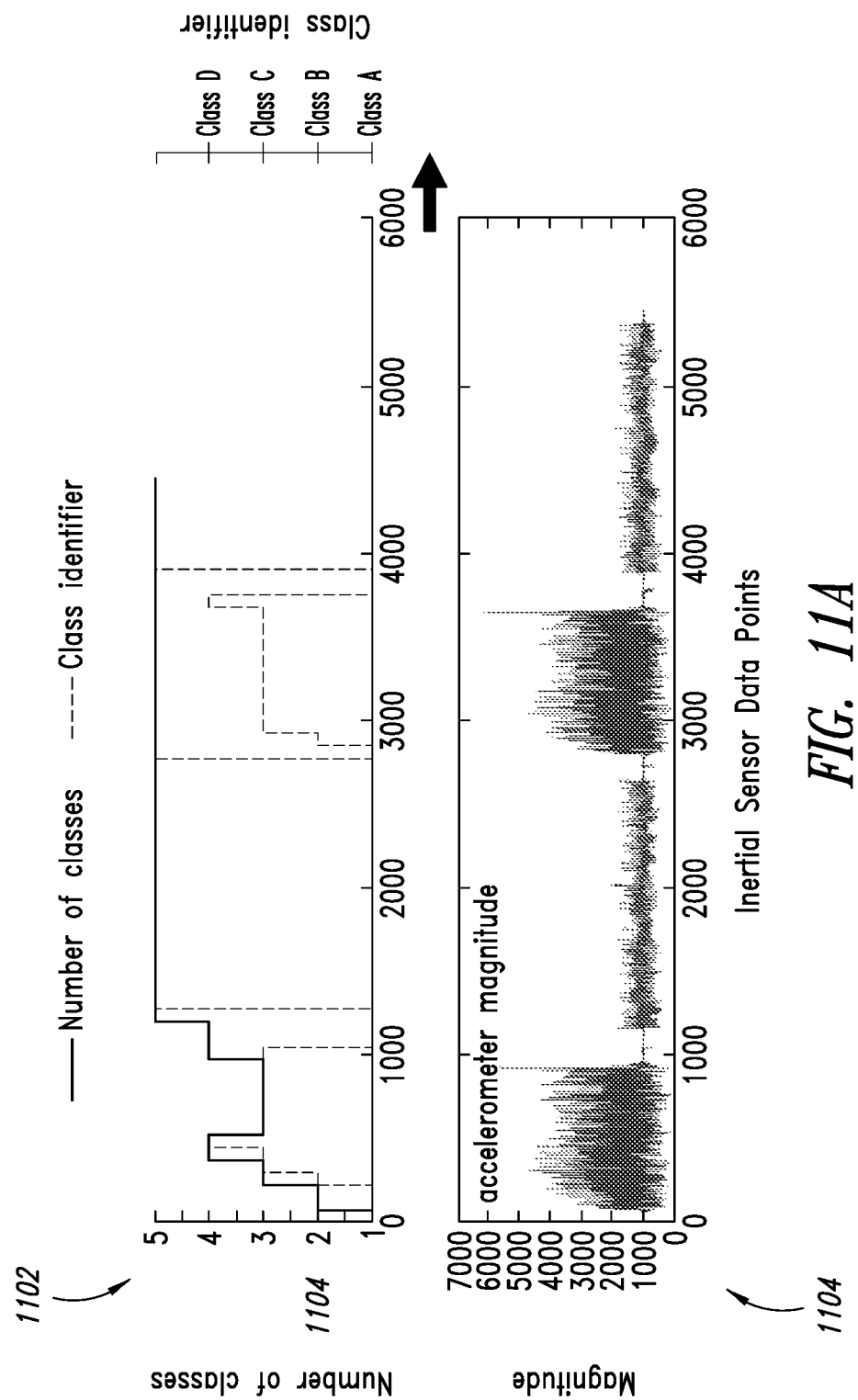
Figure 11B:
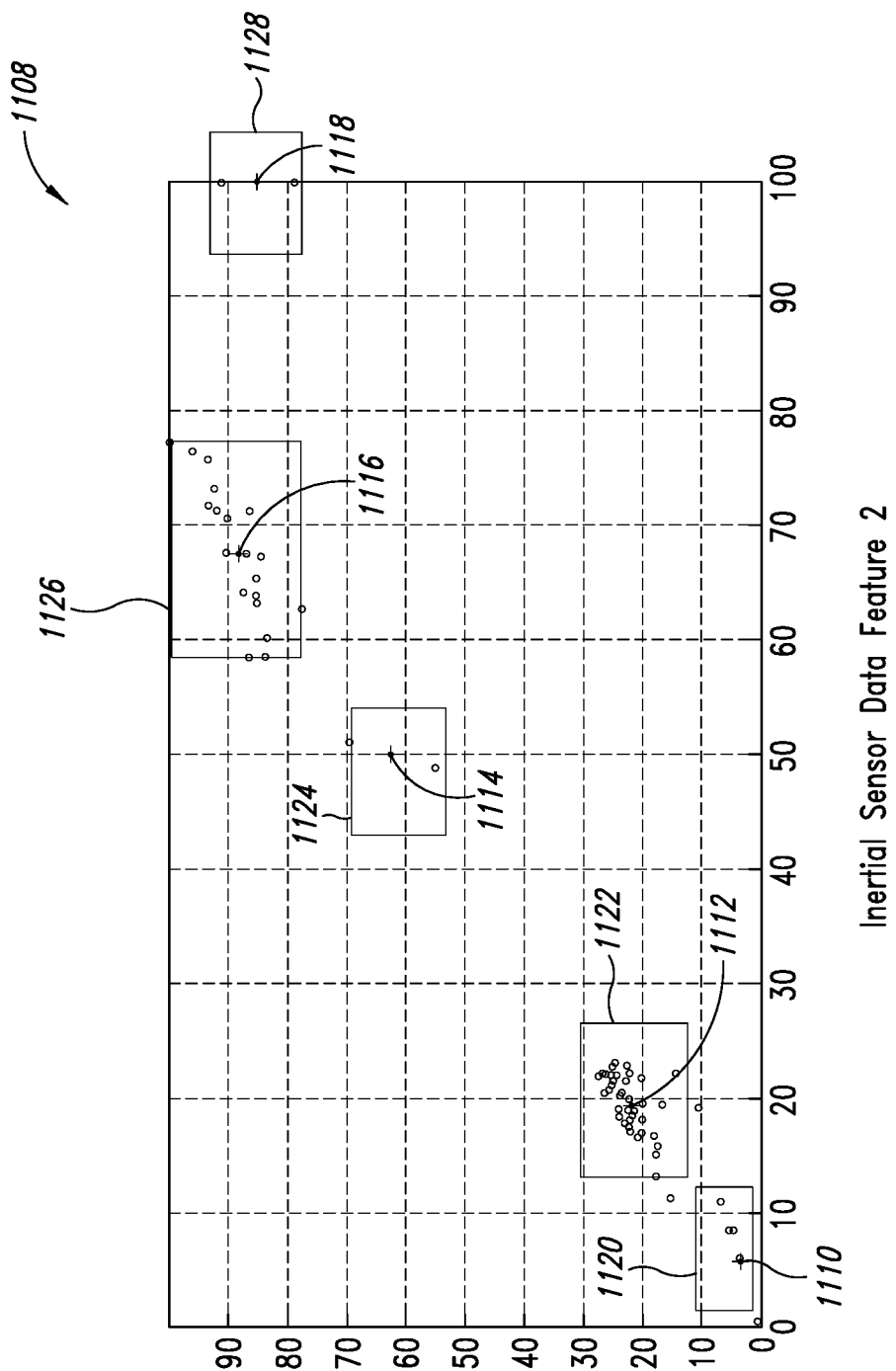

FIG. 11A illustrates graphs 1102 and 1104 to show inertial sensor data and the defining and redefining of classes over time, which are similar to graphs 802 and 804, respectively, in FIG. 8A. In this example, "Class A" may be associated with the user being still, "Class B" and "Class C" may be associated with the user running, and "Class D" may be associated with the user walking. FIG. 11B illustrates a state space 1108 generated from the inertial sensor data identified in FIG. 11A. In this example, there may be five identified classes 1120, 1122, 1124, 1126, and 1128, with representative points 1110, 1112, 1114, 1116, and 1118, respectively, within the state space 1108.

Some embodiments may take the form of or comprise computer program products. For example, according to one embodiment there is provided a computer readable medium comprising a computer program adapted to perform one or more of the methods or functions described above. The medium may be a physical storage medium, such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some or all of the methods and/or functionality may be implemented or provided in other manners, such as at least partially in firmware and/or hardware, including, but not limited to, one or more application-specific integrated circuits (ASICs), digital signal processors, discrete circuitry, logic gates, standard integrated circuits, controllers (e.g., by executing appropriate instructions, and including microcontrollers and/or embedded controllers), field-programmable gate arrays (FPGAs), complex programmable logic devices (CPLDs), etc., as well as devices that employ RFID technology, and various combinations thereof.

The various embodiments described above can be combined to provide further embodiments. Aspects of the embodiments can be modified, if necessary to employ concepts of the various embodiments and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An integrated circuit, comprising:
an inertial sensor, which, in operation, generates inertial sensor data associated with the integrated circuit; and
processing circuitry communicatively coupled to the inertial sensor, wherein the processing circuitry of the integrated circuit, in operation:
determines a new feature array from the inertial sensor data;
determines if the new feature array is within an existing class within a state space associated with the inertial sensor data;
in response to the new feature array being included in the existing class, adds the new feature array to the existing class and updates a representation of the existing class in the state space based on the new feature array and an existing representation of the existing class;
in response to the new feature array not being included in the existing class, creates a new class based on the new feature array;
determines if the new feature array is within the state space; and
in response to the new feature array not being included in the state space:
   renormalizes the state space based on the new feature array and modifies the representation of the existing class based on the renormalized state space;
   renormalizes the state space based on the new feature array and rescales an area of the existing class based on the renormalized state space; or
   renormalizes the state space based on the new feature array, modifies the representation of the existing class based on the renormalized state space, and rescales the area of the existing class based on the renormalized state space.

2. The integrated circuit of claim 1, wherein the processing circuitry, in operation:
receives new inertial sensor data;
selects a class of a plurality of classes in the state space associated with the new inertial sensor data; and
instructs the integrated circuit to perform an action based on the selected class.

3. The integrated circuit of claim 1 wherein the processing circuitry, in operation:
responds to the new feature array not being included in the state space by renormalizing the state space based on the new feature array and modifying the representation of the existing class based on the renormalized state space.

4. The integrated circuit of claim 1 wherein the processing circuitry, in operation:
responds to the new feature array not being included in the state space by renormalizing the state space based on the new feature array and rescaling the area of the existing class based on the renormalized state space.

5. The integrated circuit of claim 1, wherein the processing circuitry, in operation:
rescales the area of the existing class based on the adding of the new feature array to the existing class.

6. The integrated circuit of claim 1, wherein the processing circuitry, in operation:
removes the existing class in response to a number of feature occurrences within the existing class being below a threshold value.

7. The integrated circuit of claim 1, wherein the inertial sensor includes at least one of an accelerometer or gyroscope.

8. The integrated circuit of claim 1, wherein the processing circuitry, in operation:
determines if the existing class and the new class meet an absorption criteria; and
merges the existing class and the new class in response to the absorption criteria being met.

9. The integrated circuit of claim 1, wherein the new feature array includes a peak-to-peak value and a standard deviation value associated with the inertial sensor data within a time window.

10. The integrated circuit of claim 1, wherein an area of the new class is defined by at least one predetermined value.

11. The integrated circuit of claim 1, wherein an area of the existing class is dynamically adjusted based on at least one Gaussian distribution associated with the existing class.

12. An integrated circuit, comprising:
an inertial sensor, which, in operation, generates inertial sensor data associated with the integrated circuit; and
processing circuitry embedded in the integrated circuit and communicatively coupled to the inertial sensor, wherein the processing circuitry, in operation:
determines a new feature array from the inertial sensor data;
determines if the new feature array is within an existing class within a state space associated with the inertial sensor data;
in response to the new feature array being included in the existing class, adds the new feature array to the existing class and updates a representation of the existing class in the state space based on the new feature array and an existing representation of the existing class;
in response to the new feature array not being included in the existing class, creates a new class based on the new feature array, wherein the processing circuitry, in operation:
determines if the new feature array is within the state space;
in response to the new feature array not being included in the state space, renormalizes the state space based on the new feature array;
modifies a representation of two existing classes based on the renormalized state space;
determines if the two existing classes meet an absorption criteria; and
merges the two existing classes in response to the absorption criteria being met.

13. The integrated circuit of claim 12, wherein the processing circuitry, in operation,
in response to the new feature array not being included in the state space:
   modifies the representation of the existing class based on the renormalized state space;
   rescales an area of the existing class based on the renormalized state space; or
   modifies the representation of the existing class based on the renormalized state space and rescales the area of the existing class based on the renormalized state space.

14. A personal-computing device, comprising:
an accelerometer, which, in operation, generates acceleration data; and
one or more processors of the personal computing device, wherein the one or more processors, in operation, execute computer instructions to
determine new feature values from the acceleration data;
determine if the new feature values are within a state space associated with the acceleration data;
in response to the new feature values being included in the state space, determine if the new feature values are within an existing class within the state space;
in response to the new feature values being included in the existing class, add a new state-space point to the existing class based on the new feature values and update a representative point of the existing class in the state space based on the new state-space point and existing state-space points in the existing class;
in response to the new feature values not being included in the existing class, create a new class with a representative point in the state space based on the new feature values; and
in response to the new feature values not being included in the state space:

renormalize the state space based on the new feature values and modify the representative point of the existing class based on the renormalized state space;

renormalize the state space based on the new feature values and rescale an area of the existing class based on the renormalized state space; or renormalize the state space based on the new feature values, modify the representative point of the existing class based on the renormalized state space, and rescale the area of the existing class based on the renormalized state space.

15. The personal-computing device of claim 14, wherein the one or more processors, in operation, execute the computer instructions to:
respond to the new feature values not being included in the state space by renormalizing the state space based on the new feature values and modifying the representative point of the existing class based on the renormalized state space.

16. The personal-computing device of claim 14, wherein the one or more processors, in operation, execute the computer instructions to:
respond to the new feature array not being included in the state space by renormalizing the state space based on the new feature values and rescaling the area of the existing class based on the renormalized state space.

17. The personal-computing device of claim 14, wherein the one or more processors, in operation, execute the computer instructions to:
rescale the area of the existing class based on the addition of the new state-space point to the existing class.

18. The personal-computing device of claim 14, wherein the one or more processors, in operation, execute the computer instructions to:
remove the existing class in response to a number of state-space point occurrences within the existing class being below a threshold value.

19. The personal-computing device of claim 14, wherein the one or more processors, in operation, execute the computer instructions to:
determine if the existing class and the new class meet an absorption criteria; and
in response to the absorption criteria being met, merge the existing class and the new class with a new representative point in the state space based on existing state-space points in the existing class and the new state-space point.

20. A personal-computing device, comprising:
an accelerometer, which, in operation, generates acceleration data; and
one or more processors of the personal computing device, which in operation, execute computer instructions to
determine new feature values from the acceleration data;
determine if the new feature values are within a state space associated with the acceleration data;
in response to the new feature values being included in the state space, determine if the new feature values are within an existing class within the state space;
in response to the new feature values being included in the existing class, add a new state-space point to the existing class based on the new feature values and update a representative point of the existing class in the state space based on the new state-space point and existing state-space points in the existing class; and in response to the new feature values not being included in the existing class, create a new class with a representative point in the state space based on the new feature values, wherein the one or more processors, in operation, execute the computer instructions to:
in response to the new feature values not being included in the state space, renormalize the state space based on the new feature values;
modify a representative point of two existing classes based on the renormalized state space;
determine if the two existing classes meet an absorption criteria; and
in response to the absorption criteria being met, merge the two existing classes into a new merged class with a new representative point in the state space based on existing state-space points in the two existing classes.

21. The personal-computing device of claim 20, wherein the one or more processors, in operation, execute the computer instructions to:
in response to the new feature values not being included in the state space:
modify the representation of the existing class based on the renormalized state space;
rescale an area of the existing class based on the renormalized state space; or
modify the representation of the existing class based on the renormalized state space and rescale the area of the existing class based on the renormalized state space.

22. A method performed by digital processing circuitry of a mobile device, comprising:
determining a new feature array indicative of movement in the mobile device;
determining if the new feature array is within a state space associated with the movement of the mobile device;
in response to the new feature array not being included in the state space, renormalizing the state space based on the new feature array;
determining if the new feature array is within a previous class within the state space;
in response to the new feature array being included in the previous class, adding the new feature array to the previous class and updating a representation of the previous class in the state space based on the new feature array;
in response to the new feature array not being included in the previous class, creating a new class based on the new feature array; and
in response to the new feature array not being included in the state space:
modifying the representation of the existing class based on the renormalized state space;
rescaling an area of the existing class based on the renormalized state space; or
modifying the representation of the existing class based on the renormalized state space and rescaling the area of the existing class based on the renormalized state space.

23. The method of claim 22, comprising:
determining if two previous classes in the state space meet an absorption criteria; and
merging the two previous classes in response to the absorption criteria being met.

24. The method of claim 22, comprising:
determining if the previous class and the new class meet an absorption criteria; and merging the previous class and the new class in response to the absorption criteria being met.

25. The method of claim 22, comprising:

removing the previous class in response to a number of feature occurrences within the previous class being below a threshold value.

\* \* \* \* \*